United States Patent
Jeong

(10) Patent No.: US 12,229,436 B2
(45) Date of Patent: Feb. 18, 2025

(54) MEMORY CONTROLLER COMPRISING MULTIPLE BUFFER MEMORIES, AND HANDLING OF READ AFTER WRITE HAZARDS

(71) Applicant: SAMSUNG ELECTRONICS CO., LTD., Suwon-si (KR)

(72) Inventor: Ha-Neul Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

(21) Appl. No.: 17/572,931

(22) Filed: Jan. 11, 2022

(65) Prior Publication Data

US 2022/0350528 A1 Nov. 3, 2022

(30) Foreign Application Priority Data

Apr. 29, 2021 (KR) .................. 10-2021-0055471

(51) Int. Cl.
G06F 3/06 (2006.01)
(52) U.S. Cl.
CPC .......... *G06F 3/0656* (2013.01); *G06F 3/0613* (2013.01); *G06F 3/0634* (2013.01); *G06F 3/0659* (2013.01); *G06F 3/0679* (2013.01)
(58) Field of Classification Search
CPC .... G06F 3/0613; G06F 3/0634; G06F 3/0679; G06F 2212/7203; G06F 12/0246;
(Continued)

(56) References Cited

U.S. PATENT DOCUMENTS 5,226,147 A 7/1993 Fujishima et al.
5,509,132 A 4/1996 Matsuda et al.
(Continued)

FOREIGN PATENT DOCUMENTS

JP 2020-123038 A 8/2020
KR 10-2019-0004400 A 1/2019

OTHER PUBLICATIONS

Jongbok Lee, "Design and Simulation of ARM Processor with Interrupts", The Journal of The Institute of Internet, Broadcasting and Communication (IIBC), vol. 19, No. 6, Dec. 2019, 7 pages total.

*Primary Examiner* — Charles Rones
*Assistant Examiner* — Hewy H Li
(74) *Attorney, Agent, or Firm* — Sughrue Mion, PLLC

(57) ABSTRACT

A memory storage device includes: a memory controller configured to receive data from an outer device, and a nonvolatile memory connected to the memory controller, wherein the memory controller includes: a first buffer memory configured to store the data; a second buffer memory different from the first buffer memory; and a memory interface configured to provide the data provided from the first buffer memory to the nonvolatile memory, wherein the nonvolatile memory is configured to store the data, and provide a write done signal to the memory interface after storing the data, and wherein the memory controller is configured to copy the data stored in the first buffer memory to the second buffer memory in response to the write done signal, and remove the data stored in the first buffer memory after copying the data stored in the first buffer memory to the second buffer memory.

20 Claims, 22 Drawing Sheets

(58) Field of Classification Search
CPC ............. G06F 13/1673; G06F 12/0877; G06F 2212/1021; G06F 12/0866; G06F 3/0656–0659; G11C 7/18; G11C 8/10; G11C 8/14; G11C 16/06
See application file for complete search history.

(56) References Cited

U.S. PATENT DOCUMENTS

| | | | |
|---|---|---|---|
| 5,586,291 A * | 12/1996 | Lasker | G06F 12/0866 |
| | | | 711/E12.019 |
| 5,953,739 A * | 9/1999 | Zagar | G11C 7/1006 |
| | | | 711/E12.041 |
| 6,233,648 B1 * | 5/2001 | Tomita | G06F 3/0613 |
| | | | 711/170 |
| 6,941,414 B2 | 9/2005 | Hsu et al. | |
| 9,037,800 B2 * | 5/2015 | Ellard | G06F 12/0868 |
| | | | 711/120 |
| 9,076,530 B2 * | 7/2015 | Gomez | G11C 16/22 |
| 9,342,461 B2 | 5/2016 | Liang et al. | |
| 9,910,619 B2 | 3/2018 | Delaney et al. | |
| 10,282,294 B2 | 5/2019 | Chang et al. | |
| 10,719,446 B2 | 7/2020 | Loaiza et al. | |
| 11,662,962 B2 * | 5/2023 | Miyamoto | G06F 3/1284 |
| | | | 358/1.6 |
| 2012/0047318 A1 * | 2/2012 | Yoon | G06F 3/0613 |
| | | | 711/E12.008 |
| 2014/0372667 A1 * | 12/2014 | Tan | G06F 11/1048 |
| | | | 711/103 |
| 2015/0309927 A1 | 10/2015 | Sinclair et al. | |
| 2017/0123991 A1 * | 5/2017 | Sela | G06F 12/0246 |
| 2019/0004949 A1 * | 1/2019 | Kim | G06F 12/0246 |
| 2021/0263863 A1 * | 8/2021 | Peterson | G06F 12/0875 |
| 2022/0129192 A1 * | 4/2022 | Choi | G06F 3/0673 |

* cited by examiner

MEMORY CONTROLLER COMPRISING MULTIPLE BUFFER MEMORIES, AND HANDLING OF READ AFTER WRITE HAZARDS

CROSS-REFERENCE TO THE RELATED APPLICATION

This application claims priority from Korean Patent Application No. 10-2021-0055471 filed on Apr. 29, 2021 in the Korean Intellectual Property Office, the disclosure of which is incorporated herein in its entirely by reference.

BACKGROUND

1. Field

The present disclosure relates to a memory storage device including a nonvolatile memory, and an electronic system including the memory storage device.

2. Description of the Related Art

Semiconductor memory devices include volatile memory devices and nonvolatile memory devices. Read and write speeds of the volatile memory device are fast, whereas the volatile memory device may lose contents stored therein when it is powered-off. In contrast, since the nonvolatile memory devices maintain data stored therein even when they are powered-off, the nonvolatile memory devices are used to store data that should be maintained regardless of whether power is supplied.

For example, a volatile memory device include a static RAM (SRAM), a dynamic RAM (DRAM), a synchronous DRAM (SDRAM), and the like. Nonvolatile memory devices maintain data stored therein even when they are powered-off. For example, the nonvolatile memory device includes a read only memory (ROM), a programmable ROM (PROM), an electrically programmable ROM (EPROM), an electrically erasable and programmable ROM (EEPROM), a flash memory, a phase change RAM (PRAM), a magnetic RAM (MRAM), a resistive RAM (RAM), a ferroelectric RAM (FRAM), and the like. The flash memory may be classified into a NOR-type flash memory and a NAND-type flash memory.

In particular, the flash memory device has an advantage in that it may be implemented as a high-integrated auxiliary mass storage device, as compared with a general EEPROM.

Various memory systems are produced using a flash memory. The memory system may store data in the flash memory through a protocol or read data from the flash memory.

With the improvement of performance of the flash memory, the amount of data cached in a memory controller of the memory storage device has been increased, and performance of a cache buffer memory of the memory controller has been improved. In this case, a problem occurs in that data cached in the buffer memory of the memory controller is removed to reduce a hit rate.

SUMMARY

An object of the present disclosure is to provide a memory storage device that may improve reliability of a memory system. Another object of the present disclosure is to provide a memory storage device that may improve a hit rate for a buffer memory. The objects of the present disclosure are not limited to those mentioned above, and additional objects of the present disclosure, which are not mentioned herein, may be understood by those skilled in the art from the following description of the present disclosure.

According to embodiments, the memory storage device may include: a memory controller configured to receive data from the outer device; and a nonvolatile memory connected to the memory controller, wherein the memory controller includes: a first buffer memory configured to store the data; a second buffer memory different from the first buffer memory; and a memory interface configured to provide the data provided from the first buffer memory to the nonvolatile memory, wherein the nonvolatile memory is configured to store the data, and provide a write done signal to the memory interface after storing the data, and wherein the memory controller is configured to copy the data stored in the first buffer memory to the second buffer memory in response to the write done signal, and remove the data stored in the first buffer memory after copying the data stored in the first buffer memory to the second buffer memory.

According to embodiments, the memory controller may be further configured to receive a read request signal from the outer device, provide the data stored in the first buffer memory in response to the read request signal before the copying to the second buffer memory, and provide the data copied to the second buffer memory in response to the read request signal after the copying to the second buffer memory.

According to embodiments, the first buffer memory may be at least one static random access memory (SRAM), and the second buffer memory may be at least one dynamic random access memory (DRAM).

According to embodiments, the memory storage device may include: a memory controller configured to receive data from an outer device; and a nonvolatile memory connected to the memory controller, wherein the memory controller includes: a first buffer memory configured to store the data in a first time period; a second buffer memory configured to store the data in a second time period different from the first time period, the second buffer memory being different from the first buffer memory; and a hazard management module configured to manage a hazard to the first and second buffer memories, wherein the hazard management module configured to provide an address of the first buffer memory in response to a read command received in the first time period, and provide an address of the second buffer memory in response to the read command received in the second time period.

According to embodiments, the memory storage device may include: a memory controller configured to receive data from an outer device; and a nonvolatile memory connected to the memory controller, wherein the memory controller includes: a first buffer memory configured to store the data; a second buffer memory configured to store the data, the second buffer memory being different from the first buffer memory; and a memory interface configured to provide a write command and the data provided from the first buffer memory to the nonvolatile memory, wherein the nonvolatile memory is configured to store the data, and provide a write done signal to the memory interface after storing the data, and wherein the memory controller is configured to remove the data stored in the first buffer memory in response to the write done signal, and provide an address of the second buffer memory in response to a read command.

According to embodiments, the electronic system may include a host device; and a memory storage device configured to transmit and receive a signal to and from the host device, wherein the memory storage device includes: a memory controller configured to receive data from the host device; and a nonvolatile memory connected to the memory controller, wherein the memory controller includes: a first buffer memory configured to buffer the data; a second buffer memory different from the first buffer memory; and a memory interface configured to provide a write command and the data provided from the first buffer memory to the nonvolatile memory, wherein the nonvolatile memory is configured to store the data, and provide a write done signal to the memory controller after storing the data, and wherein the memory controller is configured to copy the data stored in the first buffer memory to the second buffer memory in response to the write done signal and remove the data stored in the first buffer memory after the copying to the second buffer memory.

BRIEF DESCRIPTION OF THE DRAWINGS

The above and other embodiments and features of the present disclosure will become more apparent by describing in detail embodiments thereof with reference to the attached drawings, in which.

DETAILED DESCRIPTION

Hereinafter, various embodiments of the present disclosure will be described with reference to the accompanying drawings. All of the embodiments described herein are example embodiments, and thus, the disclosure is not limited thereto and may be realized in various other forms. Each of the embodiments provided in the following description is not excluded from being associated with one or more features of another example or another embodiment also provided herein or not provided herein but consistent with the inventive concept.

Hereinafter, an electronic device 1 that includes a host 100, a memory controller 200, and a nonvolatile memory 300 will be described with reference to FIGS. 1 to 3.

Figure 1:
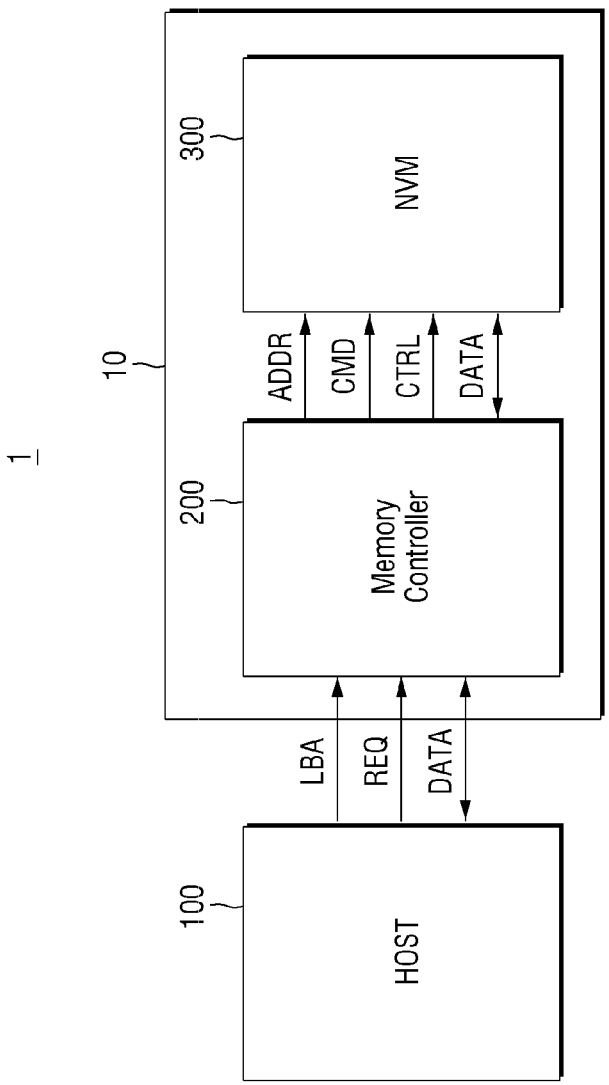
FIG. 1 is a block diagram illustrating an electronic device, according to embodiments.

FIG. 1 is a block diagram illustrating an electronic device according to some embodiments. FIG. 2 is a block diagram illustrating the memory controller of FIG. 1. FIG. 3 is a block diagram illustrating the nonvolatile memory of FIG. 1.

Referring to FIG. 1, the electronic device 1 may include a host 100 and a memory storage device 10. The host 100 and the memory storage device 10 may electrically be connected with each other. The host 100 may provide a logical block address LBA and a request signal REQ to the memory storage device 10, and the host 100 and the memory storage device 10 may transmit and receive data DATA to and from each other. For example, the host 100 may be connected with the memory controller 200.

The host 100 may include, for example, a personal computer (PC), a laptop, a mobile phone, a smart phone, a tablet PC, a server, and the like.

The memory storage device 10 may include a memory controller 200 and a nonvolatile memory 300. The memory storage device 10 may be integrated into one semiconductor device. For example, the memory storage device 10 may include an embedded Universal Flash Storage (UFS) memory device, an embedded Multi-Media Card (eMMC), or a Solid State Drive (SSD). In addition, for example, the memory storage device 10 may include a detachable UFS memory card, a Compact Flash (CF), a Secure Digital (SD), a Micro-Secure Digital (Micro-SD), a Mini-Secure Digital (Mini-SD), an extreme Digital (xD), or a memory stick. When the memory storage device 10 is an SSD, the memory storage device 10 may be a device that complies with the nonvolatile memory express (NVMe) standard.

The nonvolatile memory 300 may include a NAND flash memory in an embodiment, but the embodiment is not limited thereto. The nonvolatile memory 300 may include a NOR flash memory, or may include a resistive memory such as a phase-change random access memory (PRAM), a magneto-resistive RAM (MRAM), a ferroelectric RAM (FeRAM), and a resistive RAM (RRAM).

The memory controller 200 may be connected to the nonvolatile memory 300 to control the nonvolatile memory 300. For example, the memory controller 200 may provide an address ADDR, a command CMD and a control signal CTRL to the nonvolatile memory 300 in response to the logical block address LBA, the request signal REQ, etc. received from the host 100. For example, the memory controller 200 may provide signals to the nonvolatile memory 300 to write data in the nonvolatile memory 300, or to read data from the nonvolatile memory 300. In addition, the memory controller 200 and the nonvolatile memory 300 may transmit and receive data DATA to and from each other.

Figure 2:
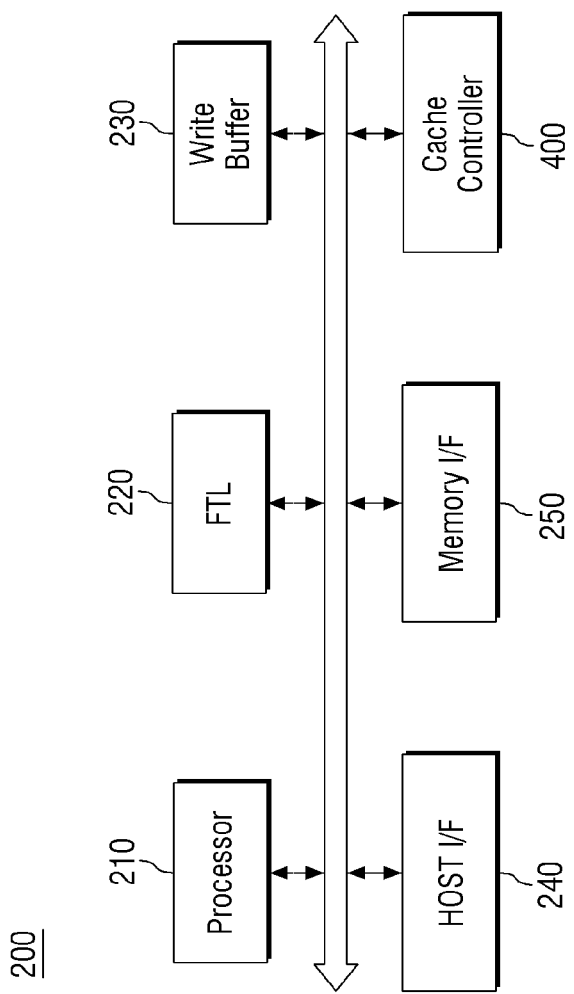
FIG. 2 is a block diagram illustrating the memory controller of FIG. 1, according to embodiments.

Referring to FIG. 2, the memory controller 200 may include a processor 210, a flash translation layer (FTL) 220, a write buffer 230, a host interface 240, a memory interface 250, and a cache controller 400.

The processor 210 may be implemented as one or more of a central processing unit (CPU), a microprocessor, a controller, and an application specific integrated circuit (ASIC). The processor 210 may control the overall operation of the memory controller 200. According to an embodiment, each of the FTL 220, the write buffer 230, the host interface 240, the memory interface 250, and the cache controller 400 may be embodied as various numbers of hardware, software and/or firmware structures with or without a corresponding memory to execute respective functions described herebelow according to the control of the processor 210. For example, the processor 210 may drive firmware loaded in the FTL 220 to control the memory controller 200.

The host interface 240 may transmit and receive packets to and from the host 100. The packet transmitted from the host 100 to the host interface 240 may include a command or data to be written in the nonvolatile memory 300, and the packet transmitted from the host interface 240 to the host 100 may include a response to the command or the data read from the nonvolatile memory 300.

The memory interface 250 may transmit the data to be written in the nonvolatile memory 300 to the nonvolatile memory 300, or may receive the data read from the nonvolatile memory 300. Such a memory interface 250 may be implemented to comply with standard regulations such as Toggle or Open NAND Flash interface (ONFI).

The FTL 220 may include system software for managing write, read, and erase operations of the nonvolatile memory 300. For example, the FTL 220 may include firmware. The firmware of the FTL 220 may be executed by the processor 210. The FTL 220 may also include software or hardware.

The FTL 220 may perform various functions, such as address mapping, wear-leveling, and garbage collection. The address mapping operation is an operation of changing a logical address received from a host to a physical address used to actually store data in the nonvolatile memory 300. The wear-leveling is a technique for preventing excessive degradation of a specific block by allowing blocks in the nonvolatile memory 300 to be uniform, and may be implemented through firmware technology for balancing erase counts of physical blocks. The garbage collection is a technique for securing an available capacity in the nonvolatile memory 300 by copying valid data of a block to a new block and erasing the block from which the valid data is copied.

The write buffer 230 may store code data required for initial booting of the memory storage device 10. The write buffer 230 may buffer the logical block address LBA, the request signal REQ, the data DATA, the command, etc., which are received from the host 100. Signals buffered in the write buffer 230 may be transferred to the nonvolatile memory 300 through the memory interface 250. For example, the data DATA buffered in the write buffer 230 may be programmed (or written) to the nonvolatile memory 300. For example, the write buffer 230 may be a volatile memory device for temporarily storing the data DATA. In addition, the write buffer 230 may be a cache memory for caching the data DATA.

Figure 3:
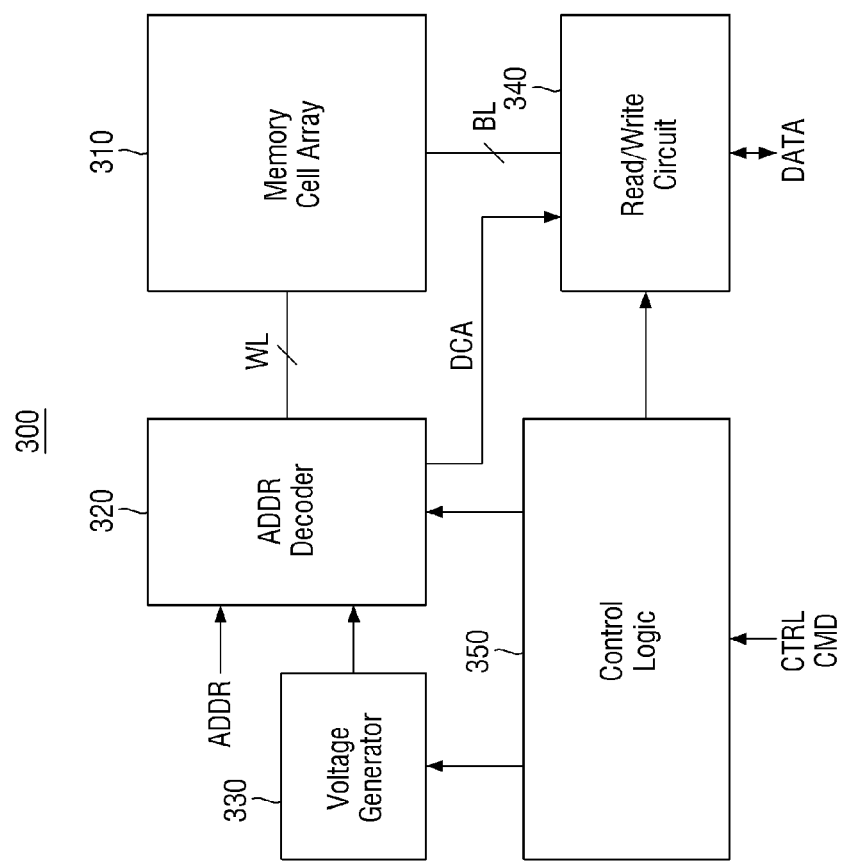
FIG. 3 is a block diagram illustrating the nonvolatile memory of FIG. 1, according to embodiments.

Referring to FIG. 3, the nonvolatile memory 300 may include a memory cell array 310, an address decoder 320, a voltage generator 330, a read write circuit 340, and a control logic circuit 350.

The memory cell array 310 may be connected to the address decoder 320 through word lines WL. The memory cell array 310 may be connected to the read write circuit 340 through bit lines BL. The memory cell array 310 may include a plurality of memory cells. For example, memory cells arranged in a row direction may be connected to a word line WL. For example, memory cells arranged in a column direction may be connected to a bit line BL.

The address decoder 320 may be connected to the memory cell array 310 through the word line WL. The address decoder 320 may operate in response to the control of the control logic circuit 350. The address decoder 320 may be supplied with an address ADDR from the memory controller 200. The address decoder 320 may be supplied with a voltage required for an operation such as a program operation and a read operation from the voltage generator 330.

The address decoder 320 may decode a row address of the received address ADDR. The address decoder 320 may select the word line WL using the decoded row address. A decoded column address DCA may be provided to the read write circuit 340. For example, the address decoder 320 may include a row decoder, a column decoder, and an address buffer.

The voltage generator 330 may generate a voltage required for an access operation under the control of the control logic circuit 350. For example, the voltage generator 330 may generate a program voltage and a program verification voltage, which are required to perform a program operation. For example, the voltage generator 330 may generate read voltages required to perform a read operation, and generate an erase voltage and an erase verification voltage, which are required to perform an erase operation. In addition, the voltage generator 330 may provide a voltage required for each operation to the address decoder 320.

The read write circuit 340 may be connected to the memory cell array 310 through the bit line BL. The read write circuit 340 may transmit and receive the data DATA to and from the memory controller 200. The read write circuit 340 may operate in response to the control of the control logic circuit 350. The read write circuit 340 may be supplied with the decoded column address DCA from the address decoder 320. The read write circuit 340 may select the bit line BL using the decoded column address DCA.

For example, the read write circuit 340 may program the received data DATA to the memory cell array 310. The read write circuit 340 may read the data from the memory cell array 310 and provide the read data to the outside (e.g., memory controller 200). For example, the read write circuit 340 may include a sensing amplifier, a write driver, a column selection circuit, and a page buffer. For example, the read write circuit 340 may buffer the data DATA received from the memory controller 200 in the page buffer, and program the buffered data DATA to the memory cell array 310.

The control logic circuit 350 may be connected to the address decoder 320, the voltage generator 330, and the read write circuit 340. The control logic circuit 350 may control the operation of the nonvolatile memory 300. The control logic circuit 350 may operate in response to a control signal CRTL and a command CMD (e.g., a write command and a read command) provided from the memory controller 200. According to an embodiment, the control logic circuit 350 may be implemented as one or more of a CPU, a microprocessor, and an ASIC. Further, according to an embodiment, each of the address decoder 320, the voltage generator 330, and the read write circuit 340 may be embodied as various numbers of hardware, software and/or firmware structures with or without a corresponding memory to execute respective functions described herein according to the control of the control logic circuit 350.

Figure 4:
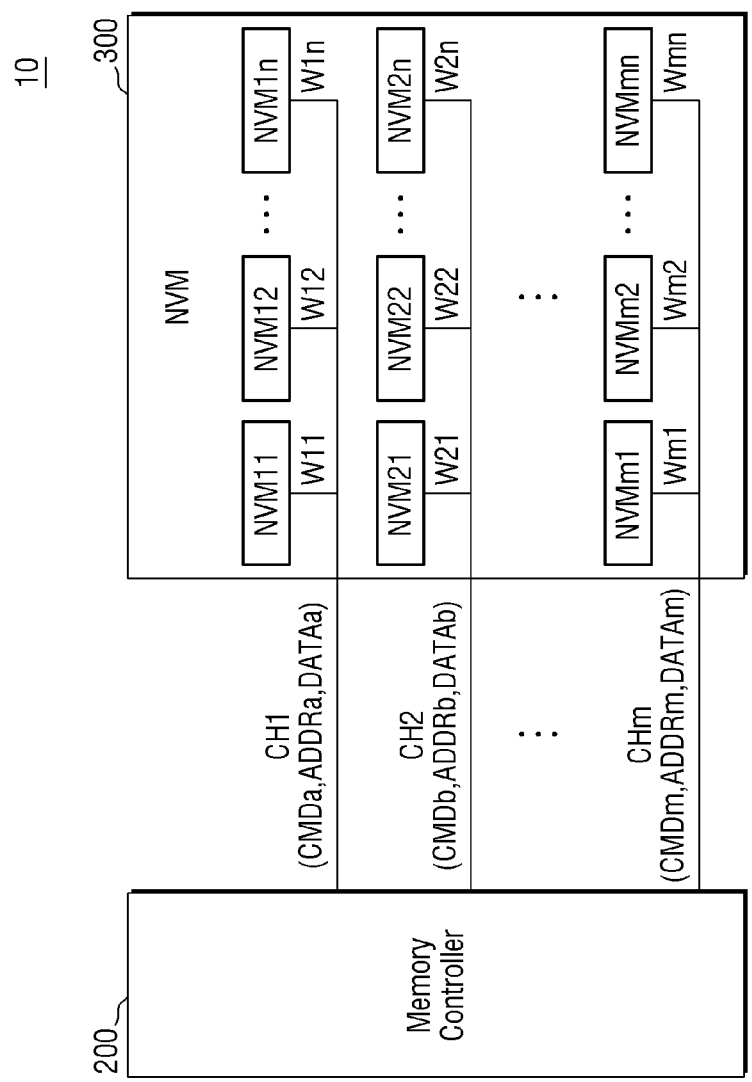
FIG. 4 is a block diagram illustrating the memory controller and the nonvolatile memory of FIG. 1, according to embodiments.

FIG. 4 is a block diagram illustrating the memory controller and the nonvolatile memory of FIG. 1.

Referring to FIG. 4, the memory storage device 10 may include a memory controller 200 and a nonvolatile memory 300. The memory storage device 10 may support a plurality of channels CH1 to CHm, and the memory controller 200 and the nonvolatile memory 300 may be connected with each other through the plurality of channels CH1 to CHm. For example, the memory storage device 10 may be implemented as a storage device such as a solid state drive (SSD).

The nonvolatile memory 300 may include a plurality of nonvolatile memory devices NVM11 to NVMmn. Each of the nonvolatile memory devices NVM11 to NVMmn may be connected to one of the plurality of channels CH1 to CHm through a corresponding way. For example, the nonvolatile memory devices NVM11 to NVM1$n$ may be connected to the first channel CH1 through the ways W11 to W1$n$, and the nonvolatile memory devices NVM21 to NVM2$n$ may be connected to the second channel CH2 through the ways W21 to W2$n$. In an exemplary embodiment, each of the nonvolatile memory devices NVM11 to NVMmn may be implemented in a random memory unit capable of operating in accordance with an individual command from the memory controller 200. For example, each of the nonvolatile memory devices NVM11 to NVMmn may be implemented as a chip or a die, but the present disclosure is not limited thereto.

The memory controller 200 may transmit and receive signals to and from the nonvolatile memory 300 through a plurality of channels CH1 to CHm. For example, the memory controller 200 may transmit commands CMDa to CMDm, addresses ADDRa to ADDRm and data DATAa to DATAm to the nonvolatile memory 300 through the channels CH1 to CHm, or may receive the data DATAa to DATAm from the nonvolatile memory 300.

The memory controller 200 may select one of the nonvolatile memory devices connected to the corresponding channel through each channel, and may transmit and receive signals to and from the selected nonvolatile memory device. For example, the memory controller 200 may select the nonvolatile memory device NVM11 of the nonvolatile memory devices NVM11 to NVM1$n$ connected to the first channel CH1. The memory controller 200 may transmit the command CMDa, the address ADDRa and the data DATAa to the selected nonvolatile memory device NVM11 through the first channel CH1, or may receive the data DATAa from the selected nonvolatile memory device NVM11.

The memory controller 200 may transmit and receive signals to and from the nonvolatile memory 300 in parallel through different channels. For example, the memory controller 200 may transmit the command CMDb to the nonvolatile memory 300 through the second channel CH2 while transmitting the command CMDa to the nonvolatile memory 300 through the first channel CH1. For example, the memory controller 200 may receive the data DATAb from the nonvolatile memory 300 through the second channel CH2 while receiving the data DATAa from the nonvolatile memory 300 through the first channel CH1.

The memory controller 200 may control the overall operation of the nonvolatile memory 300. The memory controller 200 may transmit a signal to the channels CH1 to CHm to control each of the nonvolatile memory devices NVM11 to NVMmn connected to the channels CH1 to CHm. For example, the memory controller 200 may transmit the command CMDa and the address ADDRa to the first channel CH1 to control a selected one of the nonvolatile memory devices NVM11 to NVM1$n$.

Each of the nonvolatile memory devices NVM11 to NVMmn may operate under the control of the memory controller 200. For example, the nonvolatile memory device NVM11 may program the data DATAa in accordance with the command CMDa, the address ADDRa and the data DATAa, which are provided to the first channel CH1. For example, the nonvolatile memory device NVM21 may read the data DATAb in accordance with the command CMDb and the address ADDRb, which are provided to the second channel CH2.

Although FIG. 4 shows that the nonvolatile memory 300 performs communication with the memory controller 200 through m number of channels and includes n number of nonvolatile memory devices to correspond to each channel, various modifications may be made in the number of channels and the number of nonvolatile memory devices connected to one channel.

Figure 5:
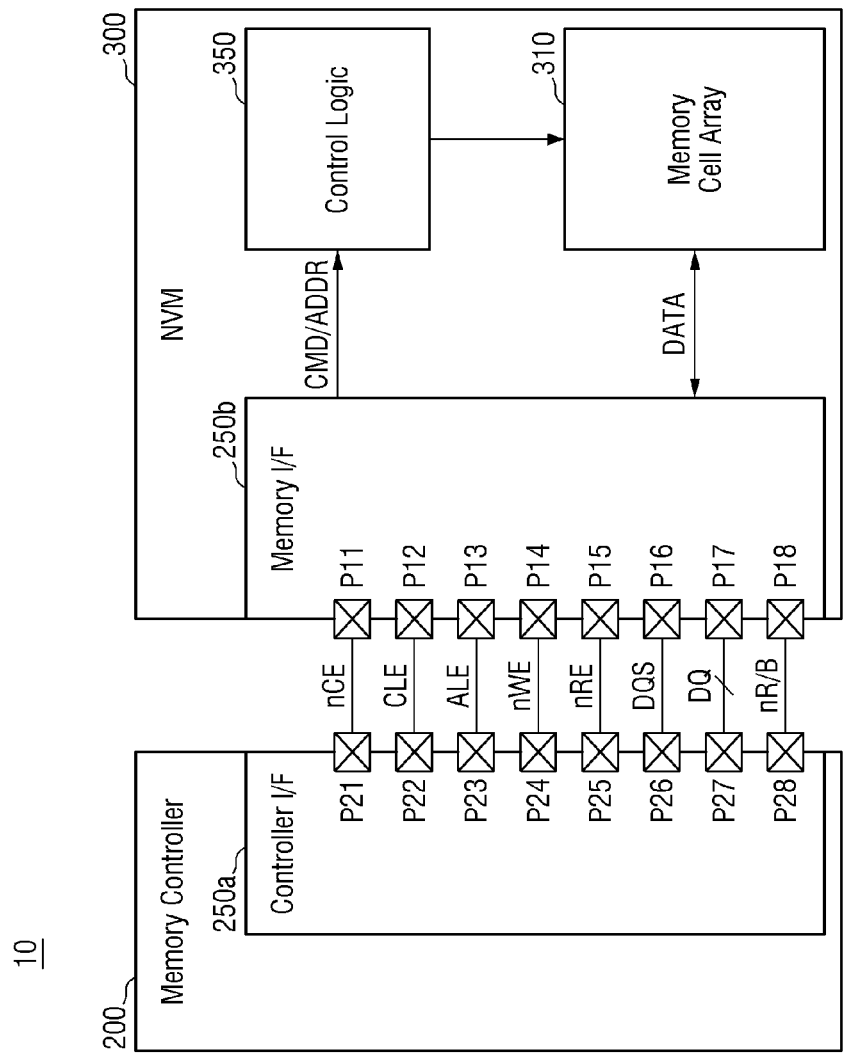
FIG. 5 is a block diagram illustrating the memory controller, the memory interface and the nonvolatile memory of FIG. 1, according to embodiments.

FIG. 5 is a block diagram illustrating the memory controller, the memory interface and the nonvolatile memory of FIG. 1. The memory interface 250 of FIG. 2 may include a controller interface circuit 250$a$ of FIG. 5.

The nonvolatile memory 300 may include first to eighth pins P11 to P18, a memory interface circuit 250$b$, a control logic circuit 350, and a memory cell array 310. In this case, the control logic circuit 350 and the memory cell array 310 may be the same as the control logic circuit 350 and the memory cell array 310 of FIG. 3.

The memory interface circuit 250$b$ may receive a chip enable signal nCE from the memory controller 200 through the first pin P11. The memory interface circuit 250$b$ may transmit and receive signals to and from the memory controller 200 through the second to eighth pins P12 to P18 in accordance with the chip enable signal nCE. For example, when the chip enable signal nCE is in an enable state (e.g., low level), the memory interface circuit 250$b$ may transmit and receive signals to and from the memory controller 200 through the second to eighth pins P12 to P18.

The memory interface circuit 250$b$ may receive a command latch enable signal CLE, an address latch enable signal ALE, and a write enable signal nWE from the memory controller 200 through the second to fourth pins P12 to P14. The memory interface circuit 250$b$ may receive a data signal DQ from the memory controller 200 through the seventh pin P17, or may transmit the data signal DQ to the memory controller 200 through the seventh pin P17. The command CMD, the address ADDR and the data DATA may be transferred through the data signal DQ. For example, the data signal DQ may be transferred through a plurality of data signal lines. In this case, the seventh pin P17 may include a plurality of pins corresponding to the plurality of data signals.

The memory interface circuit 250$b$ may acquire the command CMD from the data signal DQ received at an enable period (e.g., high level state) of the command latch enable signal CLE based on toggle timings of the write enable signal nWE. The memory interface circuit 250$b$ may acquire the address ADDR from the data signal DQ received at an enable period (e.g., high level state) of the address latch enable signal ALE based on the toggle timings of the write enable signal nWE.

In some embodiments, the write enable signal nWE may be maintained at a static state (e.g., high level or low level), and then toggled between the high level and the low level. For example, the write enable signal nWE may be toggled om a period at which the command CMD or the address ADDR is transmitted. Therefore, the memory interface circuit 250b may acquire the command CMD or the address ADDR based on the toggle timings of the write enable signal nWE.

The memory interface circuit 250b may receive a read enable signal nRE from the memory controller 200 through the fifth pin P15. The memory interface circuit 250b may receive a data strobe signal DQS from the memory controller 200 through the sixth pin P16, or may transmit the data strobe signal DQS to the memory controller 200 through the sixth pin P16.

In an output operation of the data DATA of the nonvolatile memory 300, the memory interface circuit 250b may receive the read enable signal nRE togged through the fifth pin P15 before outputting the data DATA. The memory interface circuit 250b may generate the data strobe signal DQS toggled based on toggling of the read enable signal nRE. For example, the memory interface circuit 250b may generate the data strobe signal DQS starting to be toggled after a predetermined delay (e.g., tDQSRE) based on a toggling start time of the read enable signal nRE. The memory interface circuit 250b may transmit the data signal DQ that includes the data DATA, based on the toggle timing of the data strobe signal DQS. Therefore, the data DATA may be aligned at the toggle timing of the data strobe signal DQS, and then transmitted to the memory controller 200.

In an input operation of the data DATA of the nonvolatile memory 300, when the data signal DQ including the data DATA is received from the memory controller 200, the memory interface circuit 250b may receive the strobe signal DQS toggled together with the data DATA from the memory controller 200. The memory interface circuit 250b may acquire the data DATA from the data signal DQ based on the toggle timing of the data strobe signal DQS. For example, the memory interface circuit 250b may acquire the data DATA by sampling the data signal DQ at a rising edge and a falling edge of the data strobe signal DQS.

The memory interface circuit 250b may transmit a ready/busy output signal nR/B to the memory controller 200 through the eighth pin P18. The memory interface circuit 250b may transmit state information about the nonvolatile memory 300 to the memory controller 200 through the ready/busy output signal nR/B. When the nonvolatile memory 300 is in a busy state (i.e., when an internal operation of the nonvolatile memory 300 is performed), the memory interface circuit 250b may transmit the ready/busy output signal nR/B indicating the busy state to the memory controller 200. When the nonvolatile memory 300 is in a ready state (i.e., when an internal operation of the nonvolatile memory 300 is completed or is not performed), the memory interface circuit 250b may transmit the ready/busy output signal nR/B indicating the ready state to the memory controller 200.

For example, while the nonvolatile memory 300 is reading the data DATA from the memory cell array 310 in response to a page read command, the memory interface circuit 250b may transmit the ready/busy output signal nR/B indicating the busy state (e.g., low level) to the memory controller 200. For example, while the nonvolatile memory 300 is programming the data DATA to the memory cell array 310 in response to a program command, the memory interface circuit 250b may transmit the ready/busy output signal nR/B indicating the busy state to the memory controller 200.

The control logic circuit 350 may generally control various operations of the nonvolatile memory 300. The control logic circuit 350 may receive the command/address CMD/ADDR acquired from the memory interface circuit 250b.

The control logic circuit 350 may generate control signals for controlling other components of the nonvolatile memory 300 in accordance with the received command/address CMD/ADDR. For example, the control logic circuit 350 may program the data DATA to the memory cell array 310, or may generate various control signals for reading the data DATA from the memory cell array 310.

The memory cell array 310 may store the data DATA acquired from the memory interface circuit 250b under the control of the control logic circuit 350. The memory cell array 310 may output the stored data DATA to the memory interface circuit 250b under the control of the control logic circuit 350.

The memory cell array 310 may include a plurality of memory cells. For example, the plurality of memory cells may be flash memory cells. However, the present disclosure is not limited thereto, and the memory cells may be a resistive random access memory (RRAM) cell, a ferroelectric random access memory (FRAM) cell, a phase change random access memory (PRAM) cell, a thyristor random access memory (TRAM) cell, and magnetic random access memory (MRAM) cells. Hereinafter, embodiments of the present disclosure will be described based on an embodiment in which memory cells are NAND flash memory cells.

The memory controller 200 may include first to eighth pins P21 to P28, and a controller interface circuit 250a. The first to eighth pins P21 to P28 may correspond to the first to eighth pins P11 to P18 of the nonvolatile memory 300.

The controller interface circuit 250a may transmit the chip enable signal nCE to the nonvolatile memory 300 through the first pin P21. The controller interface circuit 250a may transmit and receive signals to and from the nonvolatile memory 300 selected through the chip enable signal nCE, through the second to eighth pins P22 to P28.

The controller interface circuit 250a may transmit the command latch enable signal CLE, the address latch enable signal ALE, and the write enable signal nWE to the nonvolatile memory 300 through the second to fourth pins P22 to P24. The controller interface circuit 250a may transmit the data signal DQ to the nonvolatile memory 300 through the seventh pin P27, or may receive the data signal DQ from the nonvolatile memory 300 through the seventh pin P27.

The controller interface circuit 250a may transmit the data signal DQ, which includes the command CMD or the address ADDR, to the nonvolatile memory 300 together with a toggling write enable signal nWE. The controller interface circuit 250a may transmit the data signal DQ, which includes the command CMD, to the nonvolatile memory 300 by transmitting a command latch enable signal CLE in an enable state to the nonvolatile memory 300, and may transmit the data signal DQ, which includes the address ADDR, to the nonvolatile memory 300 by transmitting an address latch enable signal ALE in an enable state.

The controller interface circuit 250a may transmit the read enable signal nRE to the nonvolatile memory 300 through the fifth pin P25. The controller interface circuit 250a may receive the data strobe signal DQS from the nonvolatile memory 300 through the sixth pin P26, or may transmit the data strobe signal DQS to the nonvolatile memory 300 through the sixth pin P26.

In the data DATA output operation of the nonvolatile memory 300, the controller interface circuit 250a may generate a toggling read enable signal nRE, and may transmit the read enable signal nRE to the nonvolatile memory 300. For example, the controller interface circuit 250a may generate a read enable signal nRE that is changed from a static state (e.g., high level or low level) to a toggle state before the data DATA is output. Therefore, a toggling data strobe signal DQS may be generated from the nonvolatile memory 300 based on the read enable signal nRE. The controller interface circuit 250*a* may receive the data signal DQ, which includes the data DATA, together with the toggling data strobe signal DQS from the nonvolatile memory 300. The controller interface circuit 250*a* may acquire the data DATA from the data signal DQ based on the toggle timing of the data strobe signal DQS.

In the data DATA input operation of the nonvolatile memory 300, the controller interface circuit 250*a* may generate a toggling data strobe signal DQS. For example, the controller interface circuit 250*a* may generate a data strobe signal DQS that is changed from a static state (e.g., high level or low level) to a toggle state before transmitting the data DATA. The controller interface circuit 250*a* may transmit the data signal DQ, which includes the data DATA, to the nonvolatile memory 300 based on the toggle timing of the data strobe signal DQS.

The controller interface circuit 250*a* may receive the ready/busy output signal nR/B from the nonvolatile memory 300 through the eighth pin P28. The controller interface circuit 250*a* may determine the state information about the nonvolatile memory 300 based on the ready/busy output signal nR/B.

Figure 6:
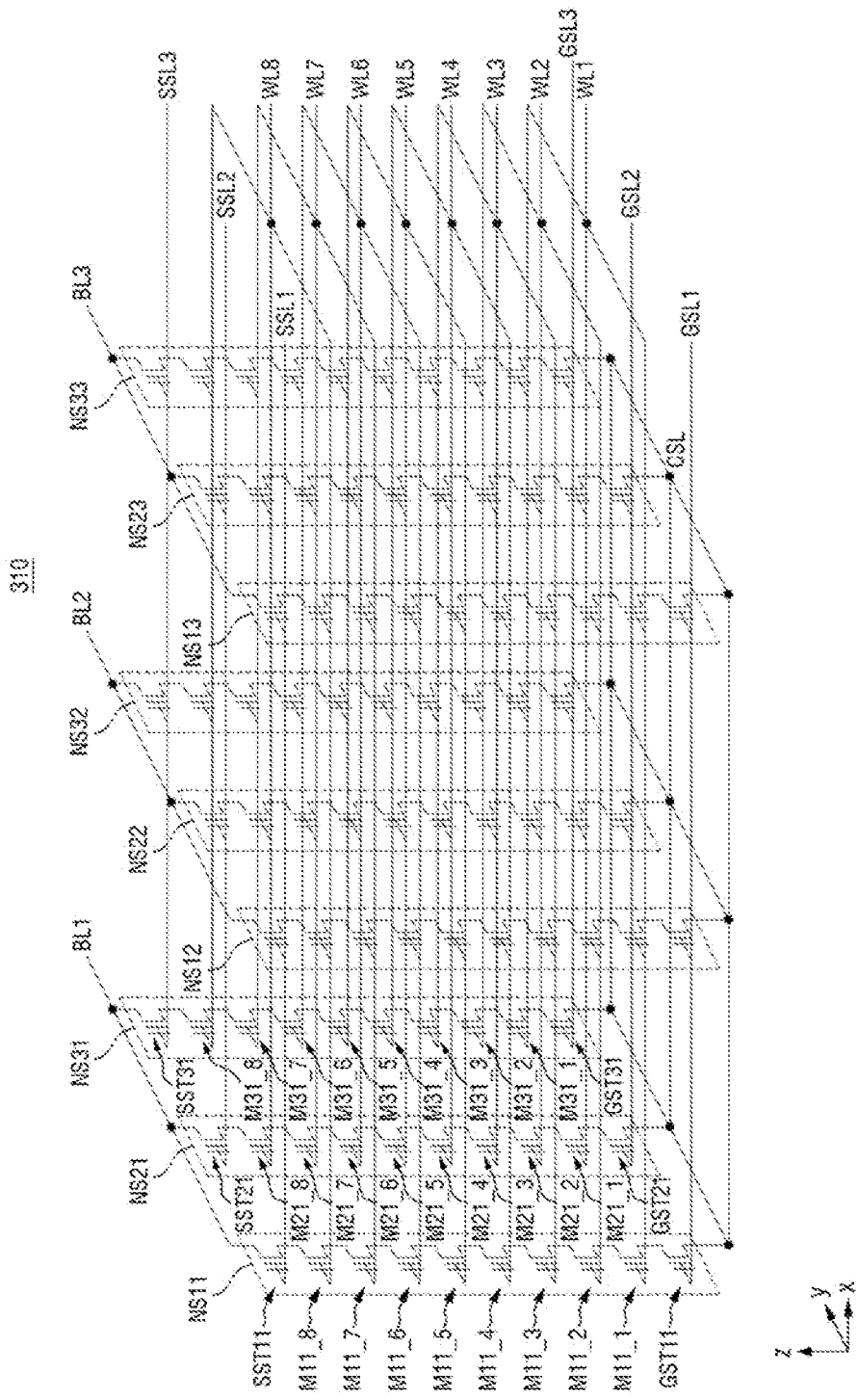
FIG. 6 is an exemplary circuit diagram illustrating a memory cell array, according to embodiments.

FIG. 6 is an exemplary circuit diagram illustrating a memory cell array according to some embodiments.

Referring to FIG. 6, a plurality of cell strings NS11, NS21, NS31, NS12, NS22, NS32, NS13, NS23 and NS33 may be disposed on a substrate (not shown) in a first direction x and a second direction y. The plurality of cell strings NS11, NS21, NS31, NS12, NS22, NS32, NS13, NS23 and NS33 may have a shape extended in a third direction z. The plurality of cell strings NS11, NS21, NS31, NS12, NS22, NS32, NS13, NS23 and NS33 may commonly be connected to a common source line CSL formed on a substrate (not shown) or within a substrate (not shown). Although the common source line CSL is shown to be connected to the lowest end of the plurality of cell strings NS11, NS21, NS31, NS12, NS22, NS32, NS13, NS23 and NS33 in the third direction z, it is sufficient that the common source line CSL is electrically connected to the lowest end of the plurality of cell strings NS11, NS21, NS31, NS12, NS22, NS32, NS13, NS23 and NS33. The common source line CSL is not limited to being physically positioned at the lower end of the plurality of cell strings NS11, NS21, NS31, NS12, NS22, NS32, NS13, NS23 and NS33. In addition, although the plurality of cell strings NS11, NS21, NS31, NS12, NS22, NS32, NS13, NS23 and NS33 are shown to be disposed in a 3×3 array, the array type and the number of the plurality of cell strings disposed in the memory cell array 310 are not limited thereto.

Some cell strings NS11, NS12 and NS13 may be connected with a first ground selection line (GSL) GSL1. Some cell strings NS21, NS22 and NS23 may be connected with a second ground selection line GSL2. Some cell strings NS31, NS32 and NS33 may be connected with a third ground selection line GSL3.

In addition, some cell strings NS11, NS12 and NS13 may be connected with a first string selection line (SSL) SSL1. Some cell strings NS21, NS22 and NS23 may be connected with a second string selection line SSL2. Some cell strings NS31, NS32 and NS33 may be connected with a third string selection line SSL3.

Each of the plurality of cell strings NS11, NS21, NS31, NS12, NS22, NS32, NS13, NS23 and NS33 may include a string selection transistor (SST) connected with each of the string selection lines. In addition, each of the plurality of cell strings NS11, NS21, NS31, NS12, NS22, NS32, NS13, NS23 and NS33 may include a ground selection transistor (GST) connected with each of the ground selection lines.

One end of the ground selection transistor of each of the plurality of cell strings NS11, NS21, NS31, NS12, NS22, NS32, NS13, NS23 and NS33 may be connected with the common source line CSL. In addition, a plurality of memory cells may sequentially be deposited between the ground selection transistor and the string selection transistor of each of the plurality of cell strings NS11, NS21, NS31, NS12, NS22, NS32, NS13, NS23 and NS33 in the third direction z. Although not shown in this drawing, each of the plurality of cell strings NS11, NS21, NS31, NS12, NS22, NS32, NS13, NS23 and NS33 may include dummy cells between the ground selection transistor and the string selection transistor. In addition, the number of string selection transistors included in each string is not limited to this drawing.

For example, the cell string NS11 may include a ground selection transistor GST11 disposed at the lowest end in the third direction z, a plurality of memory cells M11_1 to M11_8 sequentially deposited on the ground selection transistor GST11 in the third direction z, and a string selection transistor SST11 deposited on the uppermost memory cell M11_8 in the third direction z. In addition, the cell string NS21 may include a ground selection transistor GST21 disposed at the lowest end in the third direction z, a plurality of memory cells M21_1 to M21_8 sequentially deposited on the ground selection transistor GST21 in the third direction z, and a string selection transistor SST21 deposited on the uppermost memory cell M 21_8 in the third direction z. In addition, the cell string NS31 may include a ground selection transistor GST31 disposed at the lowest end in the third direction z, a plurality of memory cells M31_1 to M31_8 sequentially deposited on the ground selection transistor GST31 in the third direction z, and a string selection transistor SST31 deposited on the uppermost memory cell M31_8 in the third direction z. This configuration may similarly be applied to the configuration of the other strings.

Memory cells positioned at the same height in the third direction z from a substrate (not shown) or a ground selection transistor may electrically and commonly be connected to each word line. For example, the memory cells of the height at which the memory cells M11_1, M21_1 and M31_1 are formed may be connected with the first word line WL1. In addition, the memory cells of the height at which the memory cells M11_2, M21_2 and M31_2 are formed may be connected with the second word line WL2. Since the arrangement and structure of the memory cells connected with the third word line WL3 to the eighth word line WL8 are similar to the above arrangement and structure, their description will be omitted.

One end of the string selection transistor of each of the plurality of cell strings NS11, NS21, NS31, NS12, NS22, NS32, NS13, NS23 and NS33 may be connected with bit lines BL1, BL2 and BL3. For example, the string selection transistors ST11, SST21 and SST31 may be connected with the bit line BL1 extended in the second direction y. Since the other string selection transistors connected with the bit lines BL2 and BL3 are similar to this configuration, their description will be omitted.

Memory cells corresponding to one string (or ground) selection line and one word line may form one page. The write operation and the read operation may be performed in units of each page. Each memory cell of each page may store two or more bits. The bits written in the memory cell of each page may form logic pages.

The memory cell array 310 may be provided as a three-dimensional memory array. The three-dimensional memory array may monolithically be formed at one or more physical levels of arrays of memory cells having an active area disposed over a circuit associated with the operation of the substrate (not shown) and memory cells. The circuit associated with the operation of the memory cells may be positioned in or over the substrate. Monolithically forming means that layers of the respective levels of the three-dimensional array may directly be deposited on layers of lower levels of the three-dimensional array. Alternatively, the circuit associated with the operation of the memory cells may be connected with the uppermost contact portion in the third direction z. This will be described in detail with reference to FIG. 7.

Figure 7:
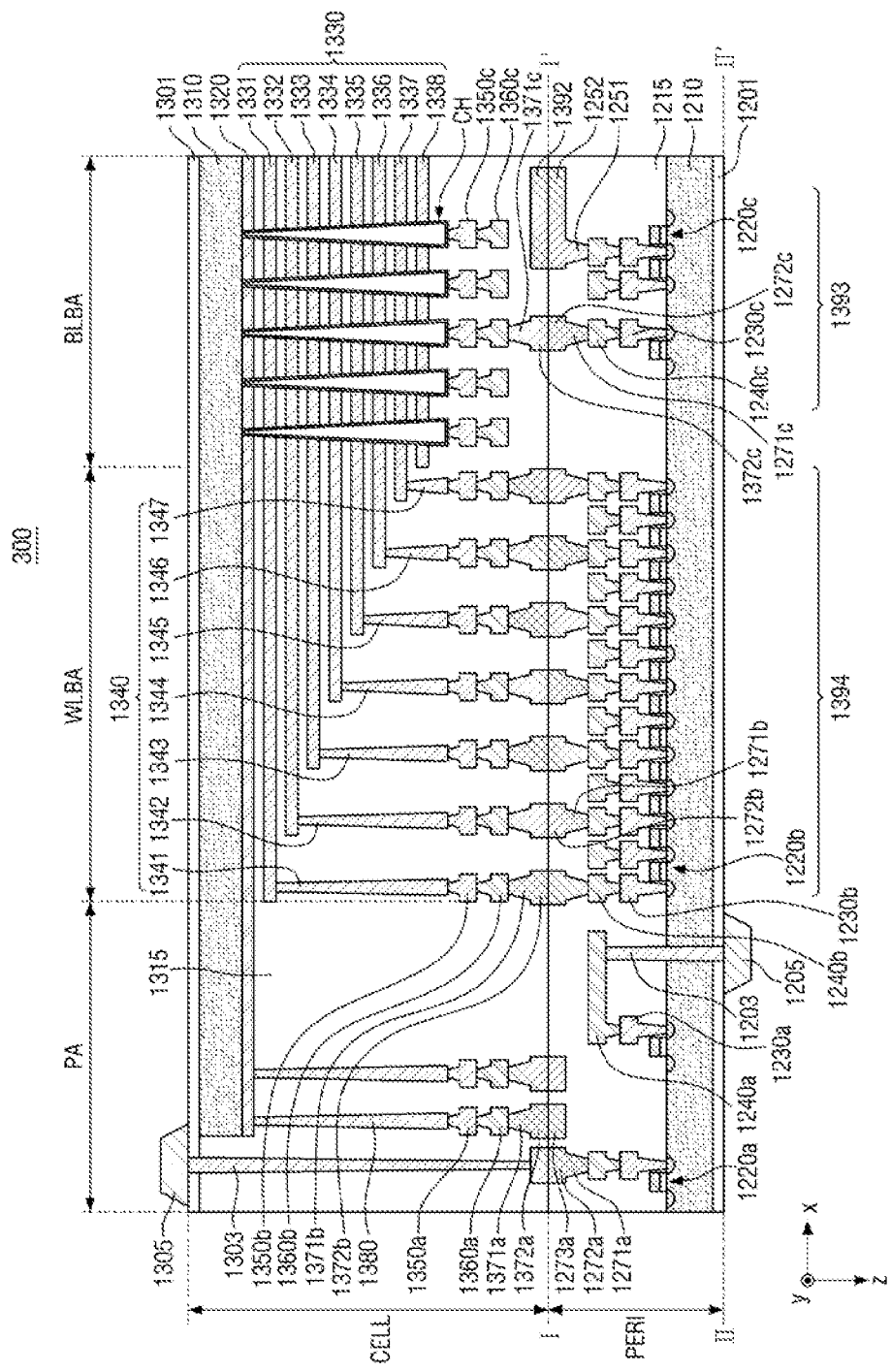
FIG. 7 is an exemplary diagram schematically illustrating the inside of a nonvolatile memory, according to embodiments.

FIG. 7 is an exemplary diagram schematically illustrating the inside of a nonvolatile memory according to some embodiments.

Referring to FIG. 7, the nonvolatile memory 300 according to some embodiments may be a chip to chip (C2C) structure. In FIG. 7, a cell area CELL of the nonvolatile memory 300 may correspond to the memory cell array 310 of FIG. 6.

In the C2C structure, after an upper chip including a cell area CELL is manufactured on a first wafer and a lower chip including a peripheral circuit area PERI is manufactured on a second wafer different from the first wafer, the upper chip and the lower chip may be connected with each other by a bonding method. For example, the bonding method may mean that a bonding metal formed on the uppermost metal layer of the upper chip and a bonding metal formed on the uppermost metal layer of the lower chip are electrically connected to each other. For example, when the bonding metal is formed of copper (Cu), the bonding method may be a Cu—Cu bonding method, and the bonding metal may be formed of aluminum or tungsten.

Each of the peripheral circuit area PERI and the cell area CELL of the nonvolatile memory 300 may include an external pad bonding area PA, a word line bonding area WLBA, and a bit line bonding area BLBA.

The peripheral circuit area PERI may include a first substrate 1210, an interlayer insulating layer 1215, a plurality of circuit elements 1220a, 1220b and 1220c formed on the first substrate 1210, first metal layers 1230a, 1230b and 1230c respectively connected with the plurality of circuit elements 1220a, 1220b and 1220c, and second metal layers 1240a, 1240b and 1240c formed on the first metal layers 1230a, 1230b and 1230c. In one embodiment, the first metal layers 1230a, 1230b and 1230c may be formed of tungsten having a relatively high resistance, and the second metal layers 1240a, 1240b and 1240c may be formed of copper having a relatively low resistance.

Although the first metal layers 1230a, 1230b and 1230c and the second metal layers 1240a, 1240b and 1240c are only shown and described herein, without limitation to this, at least one metal layer may be further formed on the second metal layers 1240a, 1240b and 1240c. At least a portion of the one or more metal layers formed on the second metal layers 1240a, 1240b and 1240c may be formed of aluminum or the like having a lower resistance than copper that forms the second metal layers 1240a, 1240b and 1240c.

The interlayer insulating layer 1215 is disposed on the first substrate 1210 to cover the plurality of circuit elements 1220a, 1220b and 1220c, the first metal layers 1230a, 1230b and 1230c, and the second metal layers 1240a, 1240b and 1240c, and may include an insulating material such as silicon oxide, silicon nitride, and the like.

Lower bonding metals 1271b and 1272b may be formed on the second metal layer 1240b of the word line bonding area WLBA. In the word line bonding area WLBA, the lower bonding metals 1271b and 1272b of the peripheral circuit area PERI may electrically be connected with upper bonding metals 1371b and 1372b of the cell area CELL by the bonding method, and the lower bonding metals 1271b and 1272b and the upper bonding metals 1371b and 1372b may be formed of aluminum, copper, or tungsten.

The cell area CELL may provide at least one memory block. The cell area CELL may include a second substrate 1310 and a common source line 1320 (corresponding to the CSL of FIG. 6). On the second substrate 1310, a plurality of word lines 1331 to 1338 (1330 corresponding to WL1 to WL8 of FIG. 6) may be deposited along the third direction z perpendicular to an upper surface of the second substrate 1310. String selection lines and ground selection line may respectively be disposed on upper and lower portions of the word lines 1330, and the plurality of word lines 1330 may be disposed between the string selection lines and the ground selection line.

In the bit line bonding area BLBA, a channel structure CH may be extended in a direction perpendicular to the upper surface of the second substrate 1310 to pass through the word lines 1330, the string selection lines, and the ground selection line. The channel structure CH may include a data storage layer, a channel layer, and a buried insulating layer, and the channel layer may electrically be connected with the first metal layer 1350c and the second metal layer 1360c. For example, the first metal layer 1350c may be a bit line contact and the second metal layer 1360c may be a bit line (corresponding to BL1 to BL3 of FIG. 5). In one embodiment, the bit line 1360c may be extended along the second direction y parallel to the upper surface of the second substrate 1310.

In one embodiment shown in FIG. 7, an area in which the channel structure CH and the bit line 1360c are disposed may be defined as the bit line bonding area BLBA. In the bit line bonding area BLBA, the bit line 1360c may electrically be connected with the circuit elements 1220c that provide a page buffer 1393 in the peripheral circuit area PERI. For example, the bit line 1360c may be connected with the upper bonding metals 1371c and 1372c in the peripheral circuit area PERI, and the upper bonding metals 1371c and 1372c may be connected with the lower bonding metals 1271c and 1272c connected to the circuit elements 1220c of the page buffer 1393.

In the word line bonding area WLBA, the word lines 1330 may be extended along the first direction x parallel with the upper surface of the second substrate 1310, and may be connected with a plurality of cell contact plugs 1341 to 1347 (1340). The word lines 1330 and the cell contact plugs 1340 may be connected to each other in pads provided by extending at least a portion of the word lines 1330 along the first direction x to have different lengths. A first metal layer 1350b and a second metal layer 1360b may sequentially be connected to upper portions of the cell contact plugs 1340 connected to the word lines 1330. The cell contact plugs 1340 may be connected with the peripheral circuit area PERI through the upper bonding metals 1371b and 1372b of the cell area CELL and the lower bonding metals 1271b and 1272b of the peripheral circuit area PERI in the word line bonding area WLBA.

The cell contact plugs 1340 may electrically be connected with the circuit elements 1220b, which provide the row decoder 1394, in the peripheral circuit area PERI. In one embodiment, the operating voltage of the circuit elements 1220b that provide the row decoder 1394 may differ from that of the circuit elements 1220c that provide the page buffer 1393. For example, the operating voltage of the circuit elements 1220c that provide the page buffer 1393 may be greater than that of the circuit elements 1220b that provide the row decoder 1394.

A common source line contact plug 1380 may be disposed in the external pad bonding area PA. The common source line contact plug 1380 may be formed of a conductive material such as a metal, a metal compound, or polysilicon, and may electrically be connected with the common source line 1320. A first metal layer 1350a and a second metal layer 1360a may sequentially be deposited on the common source line contact plug 1380. For example, an area in which the common source line contact plug 1380, the first metal layer 1350a and the second metal layer 1360a are disposed may be defined as the external pad bonding area PA.

Input and output pads 1205 and 1305 may be disposed in the external pad bonding area PA. Referring to FIG. 7, a lower insulating layer 1201 may be formed on a lower portion of the first substrate 1210 to cover a lower surface of the first substrate 1210, and the first input and output pad 1205 may be formed on the lower insulating layer 1201. The first input and output pad 1205 may be connected with at least one of the plurality of circuit elements 1220a, 1220b and 1220c disposed in the peripheral circuit area PERI through a first input and output contact plug 1203, and may be separated from the first substrate 1210 by the lower insulating layer 1201. In addition, a side insulating film may be disposed between the first input and output contact plug 1203 and the first substrate 1210 to electrically separate the first input and output contact plug 1203 from the first substrate 1210.

Referring to FIG. 7, an upper insulating layer 1301 that covers an upper surface of the second substrate 1310 may be formed on the second substrate 1310, and a second input and output pad 1305 may be disposed on the upper insulating film 1301. The second input and output pad 1305 may be connected with at least one of the plurality of circuit elements 1220a, 1220b and 1220c disposed in the peripheral circuit area PERI through the second input and output contact plug 1303.

According to embodiments, the second substrate 1310 and the common source line 1320 may not be disposed in an area where the second input and output contact plug 1303 is disposed. In addition, the second input and output pad 1305 may not overlap the word lines 1380 in the third direction z. Referring to FIG. 7, the second input and output contact plug 1303 may be separated from the second substrate 1310 in a direction parallel with the upper surface of the second substrate 1310, and may be connected with the second input and output pad 1305 by passing through an interlayer insulating layer 1315 of the cell area CELL.

According to embodiments, the first input and output pad 1205 and the second input and output pad 1305 may selectively be formed. For example, the nonvolatile memory 300 according to some embodiments may include only the first input and output pad 1205 disposed on an upper portion of the first substrate 1201, or may include only the second input and output pad 1305 disposed on an upper portion of the second substrate 1301. Alternatively, the nonvolatile memory 300 may include both the first input and output pad 1205 and the second input and output pad 1305 as shown in FIG. 7.

In each of the external pad bonding area PA and the bit line bonding area BLBA included in each of the cell area CELL and the peripheral circuit area PERI, a metal pattern of the uppermost metal layer may exist as a dummy pattern, or the uppermost metal layer may be empty.

In the external pad bonding area PA, the nonvolatile memory 300 according to some embodiments may include a lower metal pattern 1273a on the uppermost metal layer of the peripheral circuit area PERI in the same shape as that of an upper metal pattern 1372a, which is formed on the uppermost metal layer of the cell area CELL, to correspond to the upper metal pattern 1372a. The lower metal pattern 1273a formed on the uppermost metal layer of the peripheral circuit area PERI may not be connected with a separate contact in the peripheral circuit area PERI. Similarly, in the external pad bonding area PA, the nonvolatile memory 300 may include an upper metal pattern on the upper metal layer of the cell area CELL in the same shape as that of a lower metal pattern, which is formed on the uppermost metal layer of the peripheral circuit area PERI, to correspond to the lower metal pattern.

Lower bonding metals 1271b and 1272b may be formed on the second metal layer 1240b of the word line bonding area WLBA. In the word line bonding area WLBA, the lower bonding metals 1271b and 1272b of the peripheral circuit area PERI may electrically be connected with the upper bonding metals 1371b and 1372b of the cell area CELL by the bonding method.

In addition, in the bit line bonding area BLBA, an upper metal pattern 1392 having the same shape as that of a lower metal pattern 1252 of the peripheral circuit area PERI may be formed on the uppermost metal layer of the cell area CELL to correspond to the lower metal pattern 1252 formed on the uppermost metal layer of the peripheral circuit area PERI. A contact may not be formed on the upper metal pattern 1392 formed on the uppermost metal layer of the cell area CELL.

Hereinafter, a memory controller 200 that performs a buffering operation will be described with reference to FIGS. 8 to 10.

Figure 8:
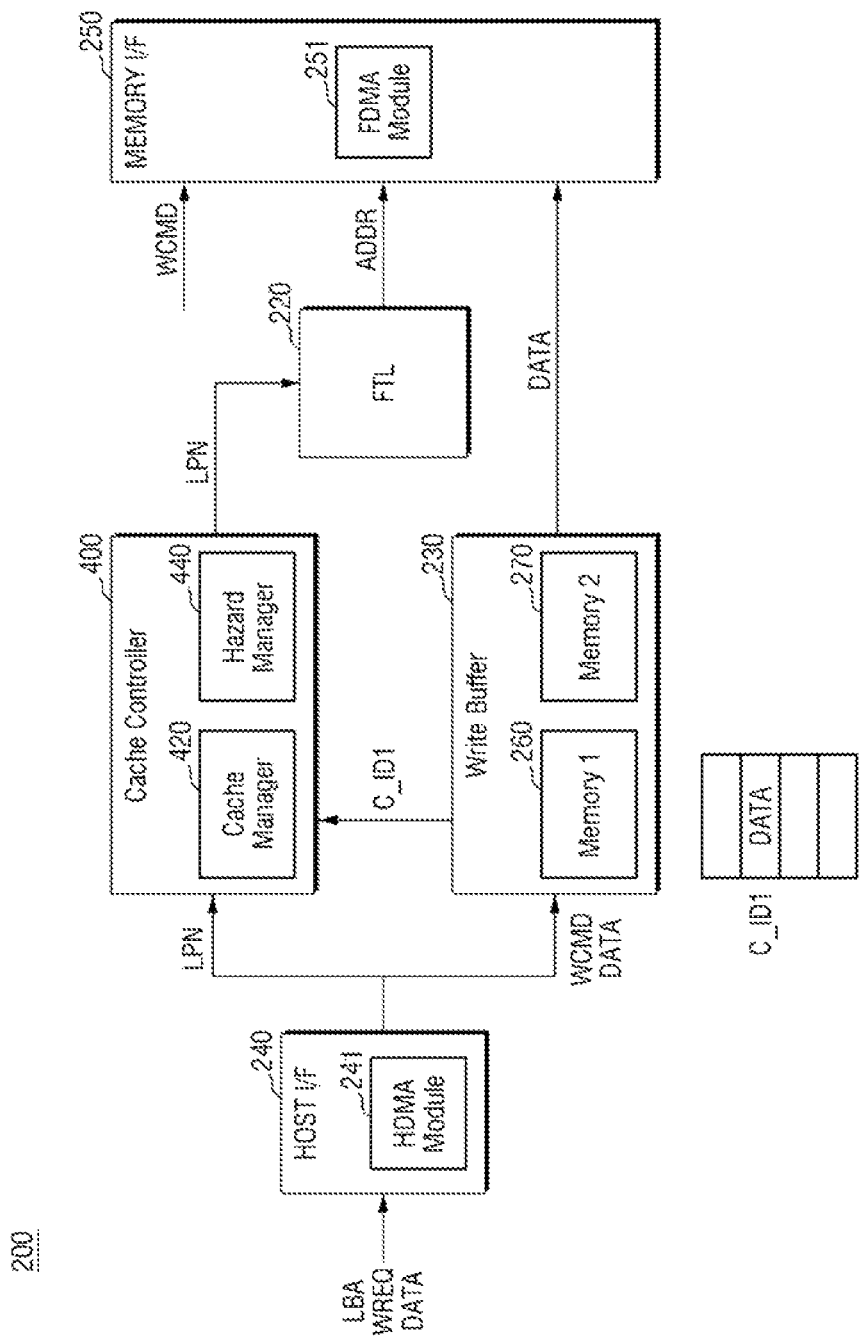
FIG. 8 is a block diagram illustrating a memory controller, according to embodiments.

FIG. 8 is a block diagram illustrating a memory controller according to some embodiments. FIG. 9 is a block diagram illustrating an operation of a memory controller and a nonvolatile memory according to some embodiments. FIG. 10 is a ladder diagram illustrating an operation of a host and a memory storage device according to some embodiments.

Figure 10:
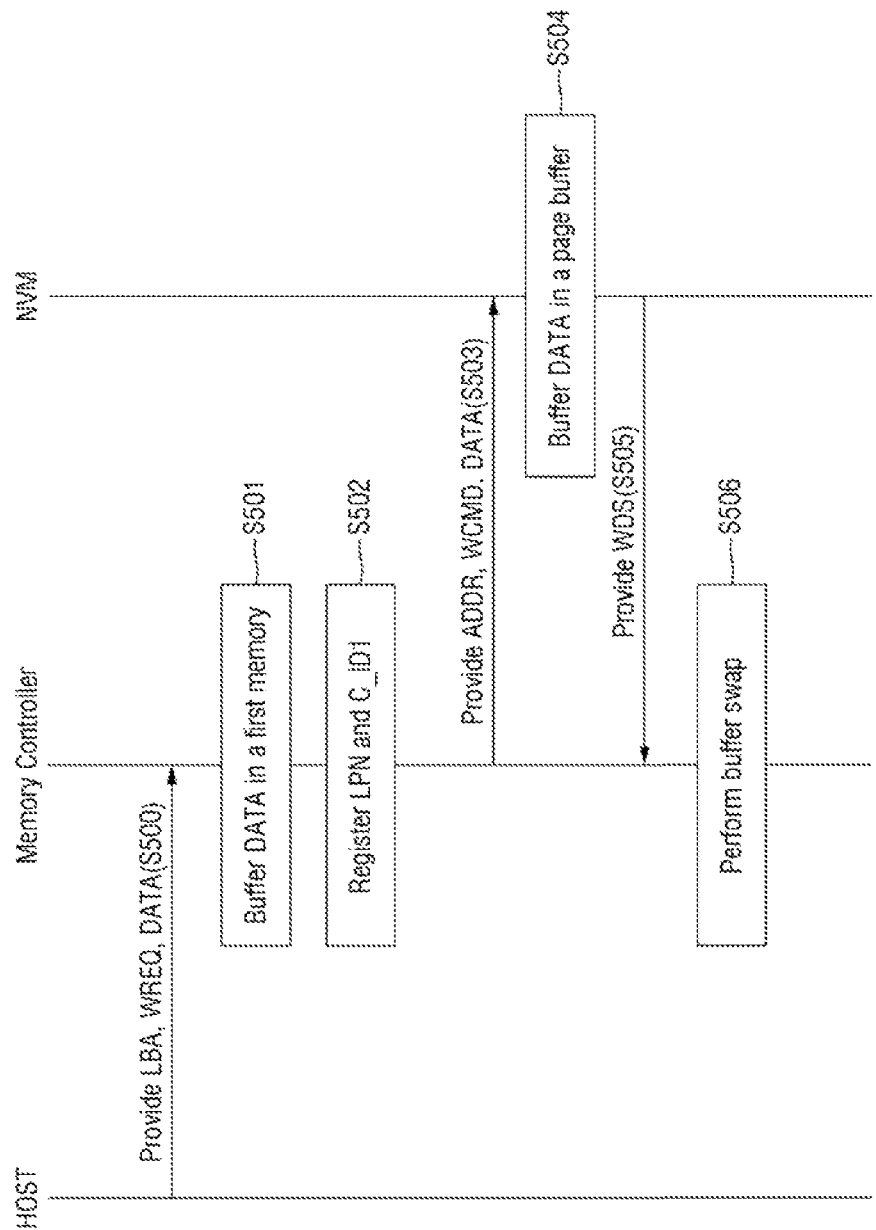
FIG. 10 is a ladder diagram illustrating an operation of a host and a memory storage device, according to embodiments.

Referring to FIGS. 8 and 10, the memory controller 200 may include a host interface 240, a write buffer 230, a cache controller 400, an FTL 220, and a memory interface 250. The configuration of the memory controller 200 may be the same as that of the memory controller 200 shown in FIG. 2.

The host 100 may provide a logical block address LBA, a write request signal WREQ, and data DATA to the memory controller 200 (S500). For example, the host 100 may provide the logical block address LBA, the write request signal WREQ, and the data DATA to the host interface 240.

The host interface 240 may include a host DMA module 241. The host interface 240 may receive the logical block address LBA, the write request signal WREQ, and the data DATA from the host 100. In this case, the host interface 240 may receive the logical block address LBA, the write request signal WREQ and the data DATA in accordance with the above-described NVMe standard, and may convert them. The host DMA module 241 may input the data DATA to the memory controller 200 using the received logical block address LBA, the write request signal WREQ and the data DATA. In this case, the host DMA module 241 may manage a direct memory access of the data DATA. For example, the host DMA module 241 may manage the data DATA to be directly input to the write buffer 230 without passing through the processor 210. However, the embodiments of the present disclosure are not limited thereto.

The host interface 240 may provide a logical page number LPN, the write request signal WREQ and the data DATA to the cache controller 400 and the write buffer 230. Although the host interface 240 is shown to provide the logical page number LPN to the cache controller 400 and provide the write request signal WREQ and the data DATA to the write buffer 230, the embodiments of the present disclosure are not limited thereto. The logical page number LPN may be a logical address converted from the logical block address LBA using the FTL 220. For example, the logical page number LPN may be the address of the memory storage device 10, in which the host 100 desires to write the data DATA.

The write buffer 230 may include a first memory 260 and a second memory 270. The first memory 260 may be a first buffer memory, and the second memory 270 may be a second buffer memory. The write buffer 230 may buffer the data DATA transferred from the host 100. The write buffer 230 may temporarily store the data DATA in accordance with the write command WCMD. The write buffer 230 may be a volatile memory. For example, the write buffer 230 may store the data DATA only for a time when the data DATA is programmed to the nonvolatile memory 300 or a later time, and may remove the data DATA at a later time after the data DATA is programmed. In addition, the write buffer 230 may provide the buffered data DATA to the memory interface 250 or the nonvolatile memory 300 in accordance with a request of the memory interface 250 or the nonvolatile memory 300.

The first memory 260 may include a static random access memory (SRAM). The second memory 270 may include a dynamic random access memory (DRAM). The storage capacity of the first memory 260 may be smaller than that of the second memory 270. In addition, the data processing speed of the first memory 260 may be greater than that of the second memory 270. That is, the amount of data processed by the SRAM, which is the first memory 260, at a specific time may be greater than the amount of data processed by the DRAM, which is the second memory 270, at a specific time.

The memory controller 200 may buffer the data DATA in the first memory 260 (S501). For example, the first memory 260 may store the data DATA received from the host interface 240 in accordance with the write command WCMD. The first memory 260 may cache the data DATA. The first memory 260 may temporarily store the data DATA in a memory device corresponding to a first cache ID C_ID1. The first cache ID C_ID1 may correspond to an address of the first memory 260, in which the data DATA is stored. The memory controller 200 buffers the data DATA only in the first memory 260, and does not buffer the data DATA in the second memory 270. In addition, the write buffer 230 may be controlled by the cache controller 400.

The write buffer 230 may provide the first cache ID C_ID1 of the first memory 260 to the cache controller 400.

The cache controller 400 may register the received logical page number LPN and the first cache ID C_ID1 (S502). The cache controller 400 may control the overall operation of the write buffer 230 and control the caching operation of the data DATA. The cache controller 400 may include a cache manager 420 and a hazard manager 440. Although the cache manager 420 and the hazard manager 440 are shown to be separated from each other, their roles may be performed singly by the cache controller 400.

The cache manager 420 may manage the caching operations for the write buffer 230. For example, the cache manager 420 may control the data DATA to be stored in the write buffer 230. The cache manager 420 may store the logical page number LPN and the first cache ID C_ID1 to correspond to each other. For example, when a read request for the logical page number LPN is received from the host 100, the cache manager 420 may check the first cache ID C_ID1 of the write buffer 230. In addition, when the address in which the data DATA is stored in the write buffer 230 is changed, the cache manager 420 may store the changed address.

The hazard manager 440 may manage a hazard to a Read After Write (RAW). The RAW corresponds to a case in which the memory storage device 10 receives a read request signal RREQ while the memory storage device 10 is writing the data DATA in accordance with the write request signal WREQ. At this time, when the data DATA which is being written is read, there may be a risk of reading old data. Therefore, the hazard manager 440 may prevent a hazard to the RAW by transmitting and receiving a signal to and from the write buffer 230 and the host interface 240. For example, if the host 100 requests a read for the logical page number LPN, the hazard manager 440 may provide the first cache ID C_ID1 corresponding to the write buffer 230 to the host 100. Therefore, the host 100 may read the data DATA from the write buffer 230.

The hazard manager 440 may also store the logical page number LPN and the first cache ID C_ID1, but the embodiments of the present disclosure are not limited thereto. For example, the hazard manager 440 may receive and use the updated logical page number LPN and the first cache ID C_ID1 from the cache manager 420.

The FTL 220 may receive the logical page number LPN or the logical block address LBA from the cache controller 400. In this case, the FTL 220 may correspond to a working memory, and may operate in firmware. The FTL 220 may convert the logical page number LPN into the address ADDR corresponding to a physical address in accordance with a mapping table. The FTL 220 may temporarily store the logical page number LPN and the address ADDR corresponding to the logical page number LPN. The address ADDR may correspond to the physical address of the nonvolatile memory 300.

The memory interface 250 may receive the write command WCMD, the address ADDR and the data DATA. In this case, the memory interface 250 may receive the address ADDR from the FTL 220 and receive the data DATA from the write buffer 230. The write buffer 230 may provide the data DATA buffered in the first memory 260 to the memory interface 250. In addition, the memory interface 250 may access the data DATA stored in the first memory 260. A flash DMA module 251 included in the memory interface 250 may control access to data DATA between the memory controller 200 and the nonvolatile memory 300. For example, the flash DMA module 251 may allow the data DATA stored in the first memory 260 to be input to the nonvolatile memory 300.

Figure 9:
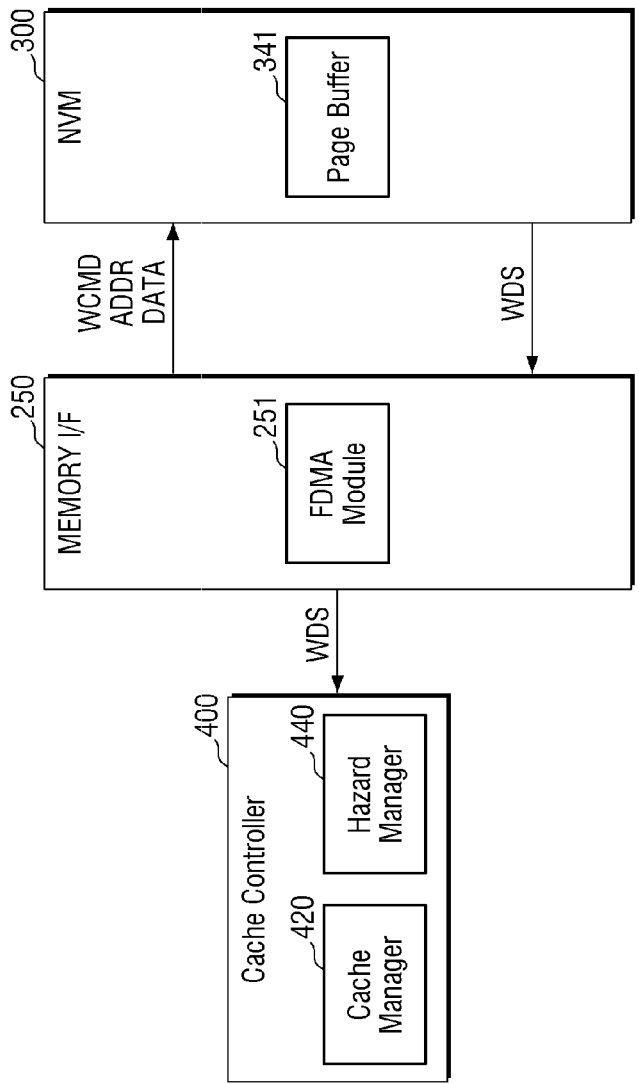
FIG. 9 is a block diagram illustrating an operation of a memory controller and a nonvolatile memory, according to embodiments.

Referring to FIGS. 9 and 10, the memory controller 200 may provide the write command WCMD, the address ADDR and the data DATA to the nonvolatile memory 300. For example, the memory interface 250 may provide the write command WCMD, the address ADDR and the data DATA to the nonvolatile memory 300. The nonvolatile memory 300 may buffer the data DATA in a page buffer 341 based on the address ADDR (S504). In this case, the page buffer 341 may be included in the read write circuit 340 shown in FIG. 3, and may be a volatile memory. For example, the page buffer 341 may include an SRAM. The page buffer 341 may temporarily store the data DATA transferred from the first memory 260 of the memory controller 200. After the data DATA is completely buffered in the page buffer 341, the data DATA may be written in the memory cell array 310 of the nonvolatile memory 300.

The nonvolatile memory 300 may provide a write done signal WDS to the memory controller 200 (S505). The nonvolatile memory 300 may output the write done signal WDS after the data DATA is buffered in the page buffer 341. For example, the nonvolatile memory 300 may output the write done signal WDS after the data DATA is completely buffered in the page buffer 341. In this case, even after the write done signal WDS is output, the nonvolatile memory 300 may write the data DATA stored in the page buffer 341 in the memory cell array 310. For example, while the data DATA is being written in the memory cell array 310, the write done signal WDS may be transferred to the memory controller 200. The write done signal WDS may be provided to the memory interface 250 of the memory controller 200. According to an embodiment, the write done signal WDS may be generated by the control logic circuit 350 of the nonvolatile memory 300, or a separate write done signal generation device or module connected with the nonvolatile memory 300 and the memory controller 200.

The memory controller 200 may receive the write done signal WDS and perform a buffer swap in response to the write done signal WDS (S506). The memory controller 200 may move the data DATA stored in the first memory 260 to the second memory 270 in response to the write done signal WDS. Further, the cache controller 400 may operate accordingly. More details on the buffer swap will be described with reference to FIGS. 11 and 12.

Figure 11:
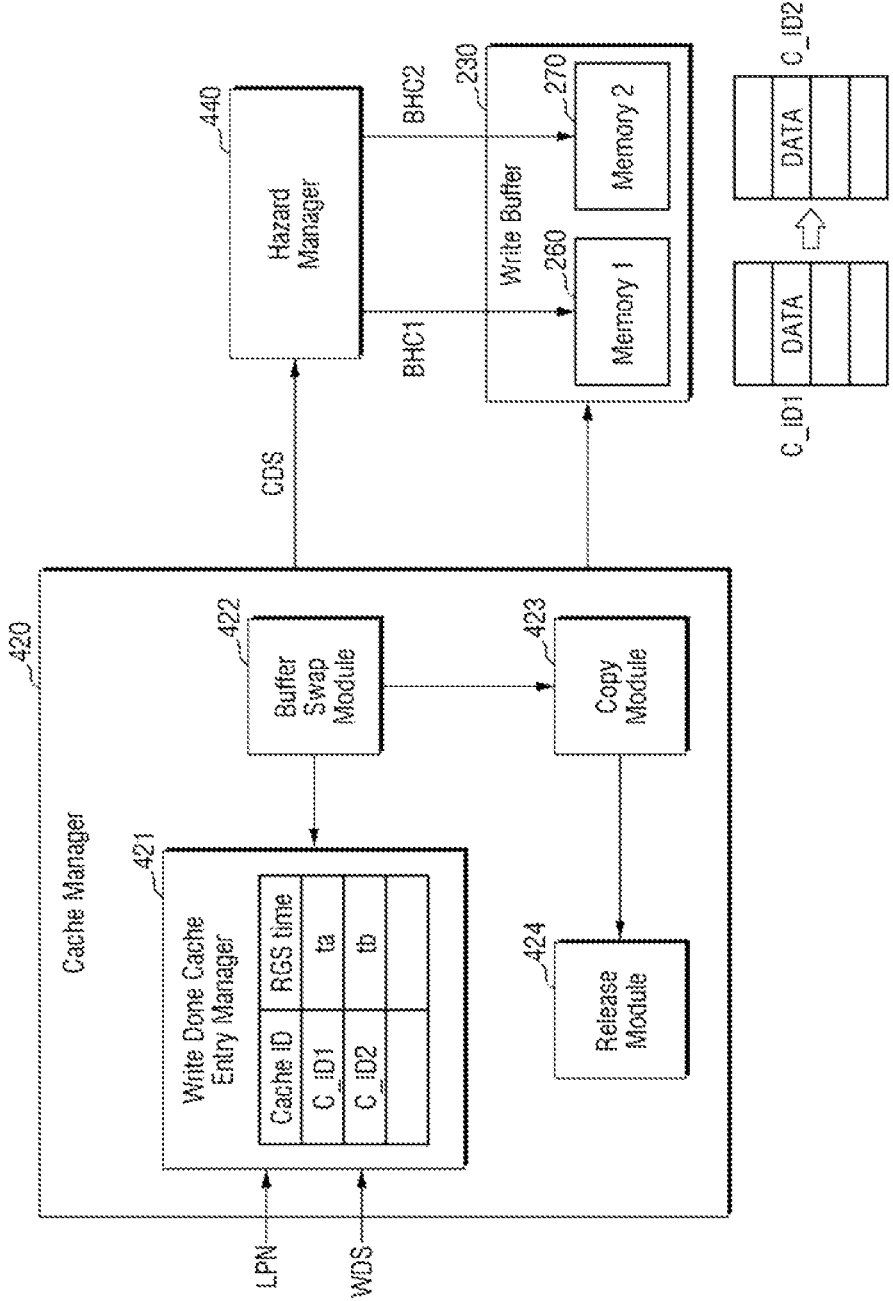
FIG. 11 is a block diagram illustrating an operation of a memory controller, according to embodiments.
Figure 12:
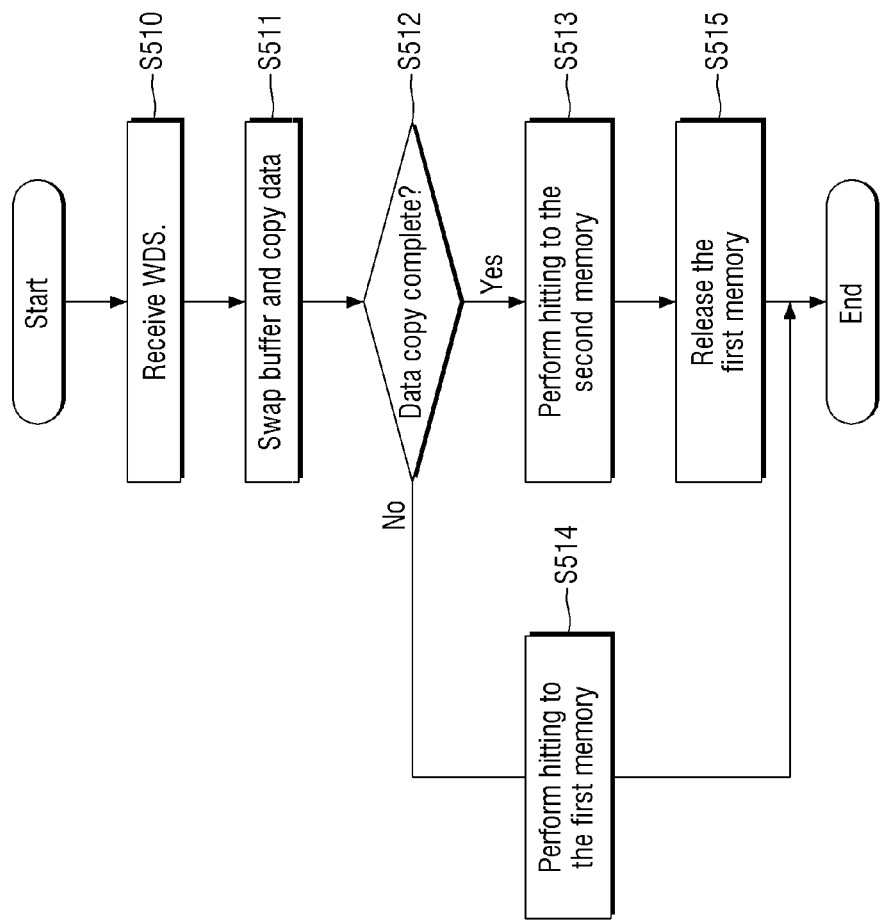
FIG. 12 is a flowchart illustrating an operation of a memory controller, according to embodiments.

FIG. 11 is a block diagram illustrating an operation of a memory controller according to some embodiments. FIG. 12 is a flowchart illustrating an operation of a memory controller according to some embodiments.

Referring to FIGS. 11 and 12, the memory controller 200 may receive the write done signal WDS (S510). For example, the cache manager 420 may receive the write done signal WDS from the memory interface 250.

The cache controller 400 may swap a buffer and copy data in response to the write done signal WDS (S511). The cache manager 420 may include a write done cache entry manager 421, a buffer swap module 422, a copy module 423, and a release module 424.

The write done cache entry manager 421 may store the first cache ID C_ID1 corresponding to the logical page number LPN. For example, the write done cache entry manager 421 may store a cache entry in which the logical page number LPN corresponds to the first cache ID C_ID1 at a first time ta. In this case, the first cache ID C_ID1 may correspond to the address of the first memory 260.

The buffer swap module 422 may change a memory buffering the data DATA in the write buffer 230 in response to the write done signal WDS. For example, the buffer swap module 422 may control the cache manager 420 to move the data DATA from the first memory 260 to the second memory 270. The buffer swap module 422 may receive a buffer swap request from the write done cache entry manager 421. The buffer swap module 422 may be assigned with a new second memory 270. After being assigned with the second memory 270, the buffer swap module 422 may request the copy module 423 to copy the data DATA.

The copy module 423 may copy the data DATA stored in the first memory 260 of the write buffer 230 to the second memory 270 in response to a copy request of the buffer swap module 422. In this case, the second memory 270 may be assigned by the buffer swap module 422. For example, the data DATA stored in the memory corresponding to the first cache ID C_ID1 of the first memory 260 may be copied to the memory corresponding to a second cache ID C_ID2 of the second memory 270. At this time, the data buffered in the first memory 260 may be maintained.

When the copy of the data DATA is completed by the copy module 423, the copy module 423 may inform the write done cache entry manager 421 that the copy has been completed. After the copy of the data DATA is completed, the write done cache entry manager 421 may change the cache entry. For example, the write done cache entry manager 421 may change the cache ID corresponding to the logical page number LPN from the first cache ID C_ID1 to the second cache ID C_ID2. In this case, the cache entry change time may be registered as a second time tb.

The release module 424 may receive a copy done signal CDS from the copy module 423, and may release the first memory 260 in response to the copy done signal CDS. That is, the data DATA stored in the first memory 260 may be removed by the release module 424. As the data DATA stored in the first memory 260 is removed after the data DATA is copied to the second memory 270, the first memory 260 may buffer new data. Therefore, performance of the memory storage device 10 that includes the released first memory 260 may be more improved.

The hazard manager 440 may perform a hit operation on the write buffer 230. For example, the hazard manager 440 may perform a hit operation on the first memory 260 by providing a first buffer hit check signal BHC1 to the first memory 260, and may perform a hit operation on the second memory 270 by providing a second buffer hit check signal BHC2 to the second memory 270. However, the embodiments of the present disclosure are not limited thereto, and the hazard manager 440 may manage the hazard to the write buffer 230 even without outputting the buffer hit check signal BHC1 or BHC2, or the like.

When the copy of the data DATA from the first memory 260 to the second memory 270 is completed (S512—Yes), the memory controller 200 may perform a hit operation on the second memory 270 (S513). In this case, the hit operation corresponds to an operation of checking whether the corresponding data exists in the write buffer 230 in response to a read request signal from the host 100. For example, a hit rate may mean a probability that data requested to be read from the host 100 exists in the write buffer 230. For example, when the data requested to be read from the host 100 exists in the write buffer 230, a hit may be generated, and when the data requested to be read from the host 100 does not exist in the write buffer 230, a hit may not be generated.

When the copy of the data DATA is not completed from the first memory 260 to the second memory 270 (S512—No), the memory controller 200 may perform the hit operation on the first memory 260 (S514). That is, the memory controller 200 may generate a hit for the data requested to be read from the host 100 regardless of whether or not the data DATA is copied. Therefore, even while the data DATA is being programmed to the memory cell array 310, the hit rate may be maintained at a high level, and the hazard to the RAW may be managed.

In addition, the memory controller 200 may release the first memory 260 (S515). For example, after the data DATA is copied to the second memory 270, the memory controller 200 may buffer new data by releasing the first memory 260. That is, the memory controller 200 may continue to use the first memory 260, and may generate a hit in the second memory 270 to which the data DATA is copied, whereby the memory storage device 10 with more improved reliability may be provided.

Referring back to FIG. 11, the release module 424 may release the second memory 270 as well as the first memory 260. For example, after the data DATA is copied to the second memory 270 and the program of the data DATA to the memory cell array 310 is completed, the second memory 270 may be released. For example, the data DATA stored in the second memory 270 may be removed, but the embodiments of the present disclosure are not limited thereto. The second memory 270 may maintain the data DATA.

Hereinafter, the hit operation performed on the write buffer 230 will be described in detail with reference to FIGS. 13 to 15.

Figure 13:
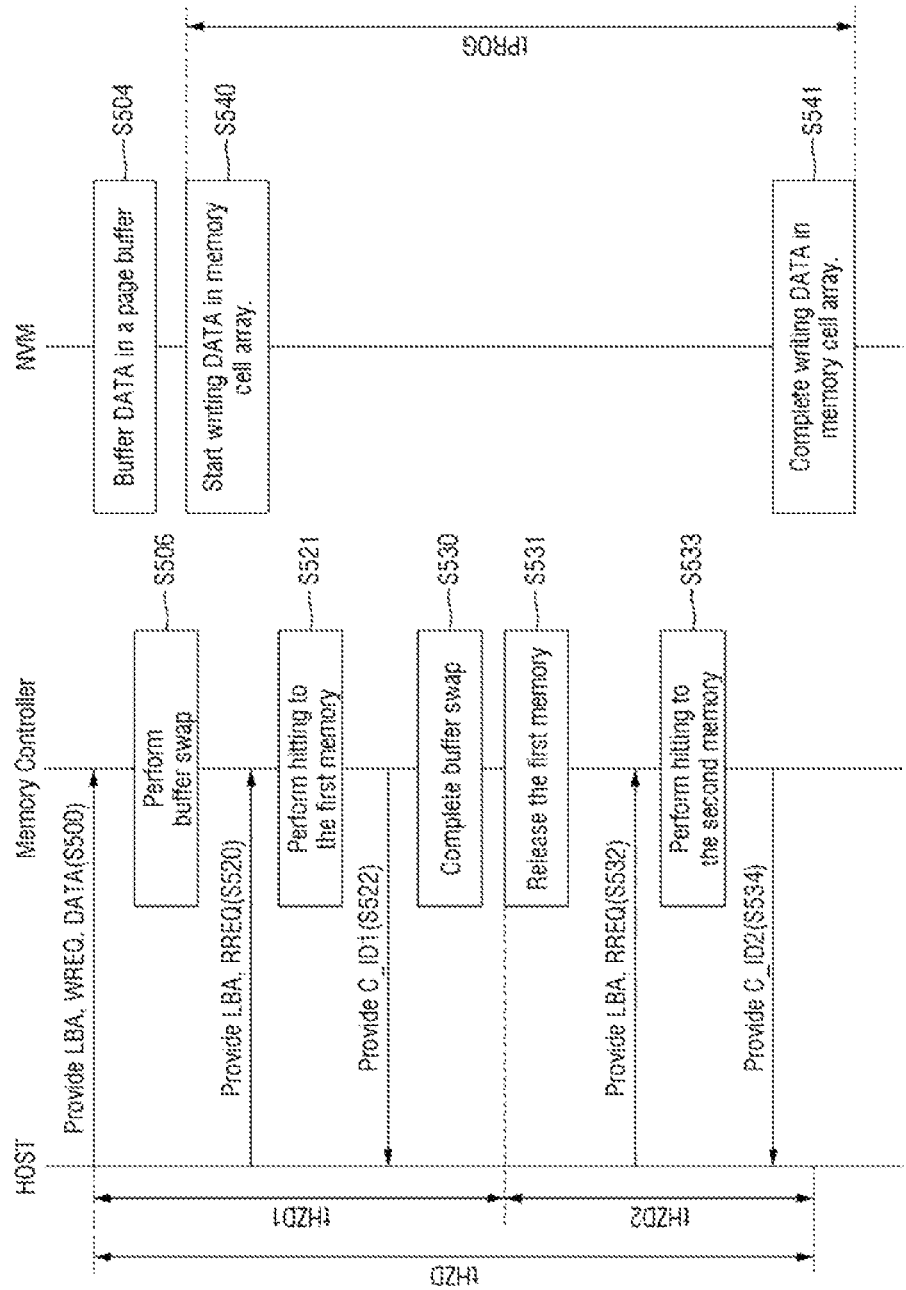
FIG. 13 is a ladder diagram illustrating an operation of a memory controller, according to embodiments.

FIG. 13 is a ladder diagram illustrating an operation of a memory controller according to some embodiments. FIGS. 14 and 15 are block diagrams illustrating operations of a memory controller according to some embodiments.

Referring to FIG. 13, after the data DATA is buffered in the page buffer 341, the nonvolatile memory 300 may start to write the data DATA in the memory cell array 310 (S540). The nonvolatile memory 300 may write the data DATA in the memory cell array 310 in a program time period tPROG. After the program time period tPROG passes, the nonvolatile memory 300 may completely write the data DATA in the memory cell array 310 (S541). For example, the nonvolatile memory 300 may write the data DATA in the memory cell array 310 separately from the operation of the host 100 and the memory controller 200.

The hazard manager 440 may manage the RAW hazard for a read request signal from the host 100 in a hazard management time period tHZD. The hazard management time period tHZD may include a first hazard management time period tHZD1 and a second hazard management time period tHZD2. In this case, the first hazard management time period tHZD1 and the second hazard management time period tHZD2 may be continuous temporally. The first hazard management time period tHZD1 may be a time period from the time when the memory controller 200 receives the logical block address LBA, the write request signal WREQ and the data DATA to the time when the buffer swap is completed. The second hazard management time period tHZD2 may be a time period from the time when the memory controller 200 completes the buffer swap to the time when the data DATA is completely written in the memory cell array 310. The program time period tPROG may overlap the hazard management time period tHZD.

Figure 14:
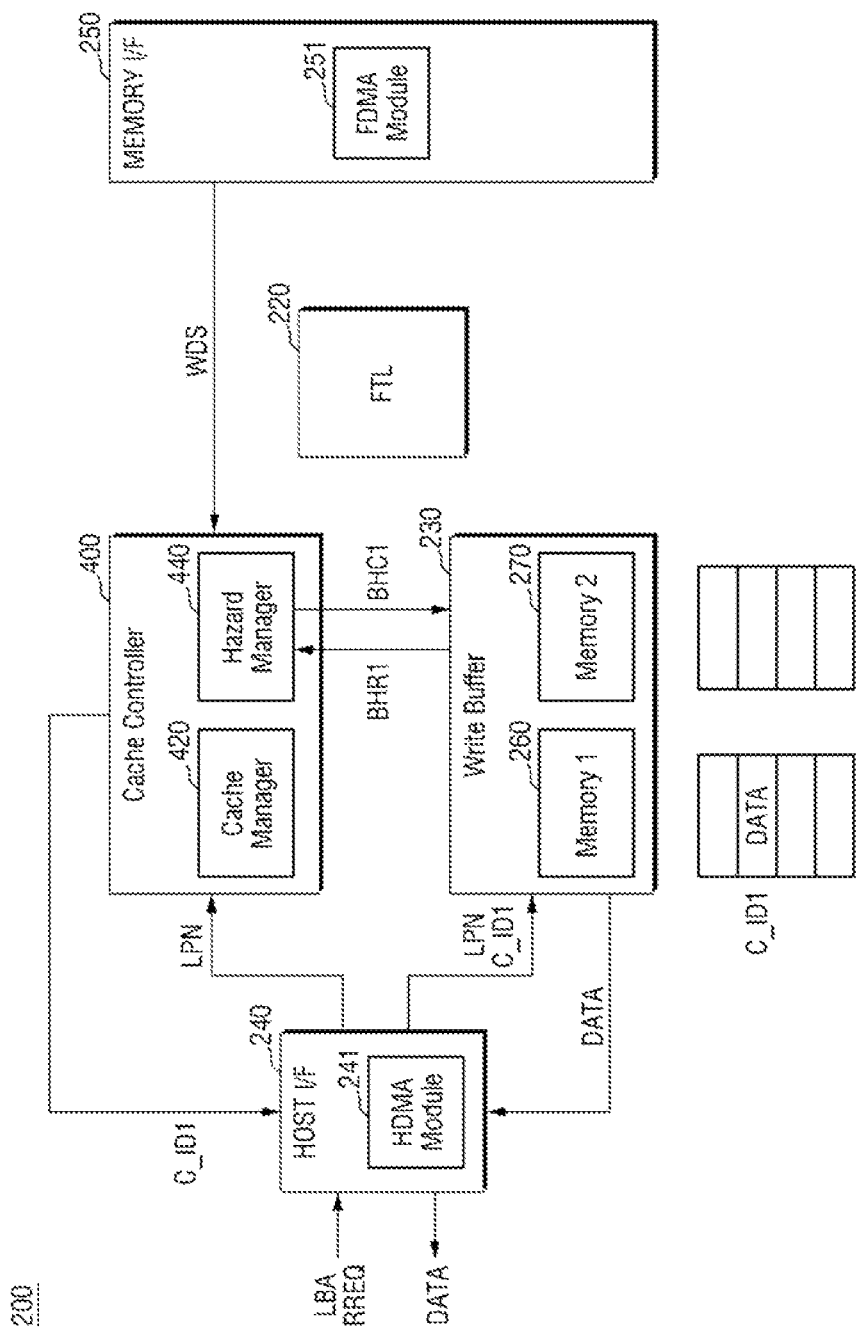
FIGS. 14 and 15 are block diagrams illustrating operations of a memory controller, according to embodiments.

Referring to FIGS. 13 and 14, the host 100 may provide the logical block address LBA and the read request signal RREQ to the memory controller 200 (S520). The host interface 240 may receive the logical block address LBA and the read request signal RREQ to provide the logical page number LPN to the cache controller 400. At this time, the first hazard management time period tHZD1 corresponds to the time before the buffer swap of the memory controller 200 is completed.

The hazard manager 440 may perform a hit on the first memory 260 corresponding to the received logical page number LPN (S521). For example, the hazard manager 440 may provide the first buffer hit check signal BHC1 to the write buffer 230, and may receive a first buffer hit response signal BHR1 in response to the first buffer hit check signal BHC1. At this time, the hazard manager 440 may check that the data DATA corresponding to the logical page number LPN exists in the first memory 260. However, the embodiments of the present disclosure are not limited to this example, and the first buffer hit check signal BHC1 and the first buffer hit response signal BHR1 may be omitted.

The hazard manager 440 may provide the host interface 240 with the first cache ID C_ID1 corresponding to the address of the first memory 260 in which the data DATA is stored. The host interface 240 may provide the first cache ID C_ID1 to the host 100 (S522), and the host 100 may receive the first cache ID C_ID1. The write buffer 230 may receive the first cache ID C_ID1 and the logical page number LPN, and may provide the data DATA buffered in the first memory 260 to the host interface 240 in response to the first cache ID C_ID1 and the logical page number LPN. The host interface 240 may provide the data DATA to the host 100. Therefore, the host 100 may read the data DATA without a RAW risk in the first hazard management time period tHZD1.

The memory controller 200 may complete the buffer swap (S530), and may release the first memory (S531). After the buffer swap is completed or after the first memory is released, the hazard manager 440 may manage the hazard to the second memory 270 in the second hazard management time period tHZD2.

Figure 15:
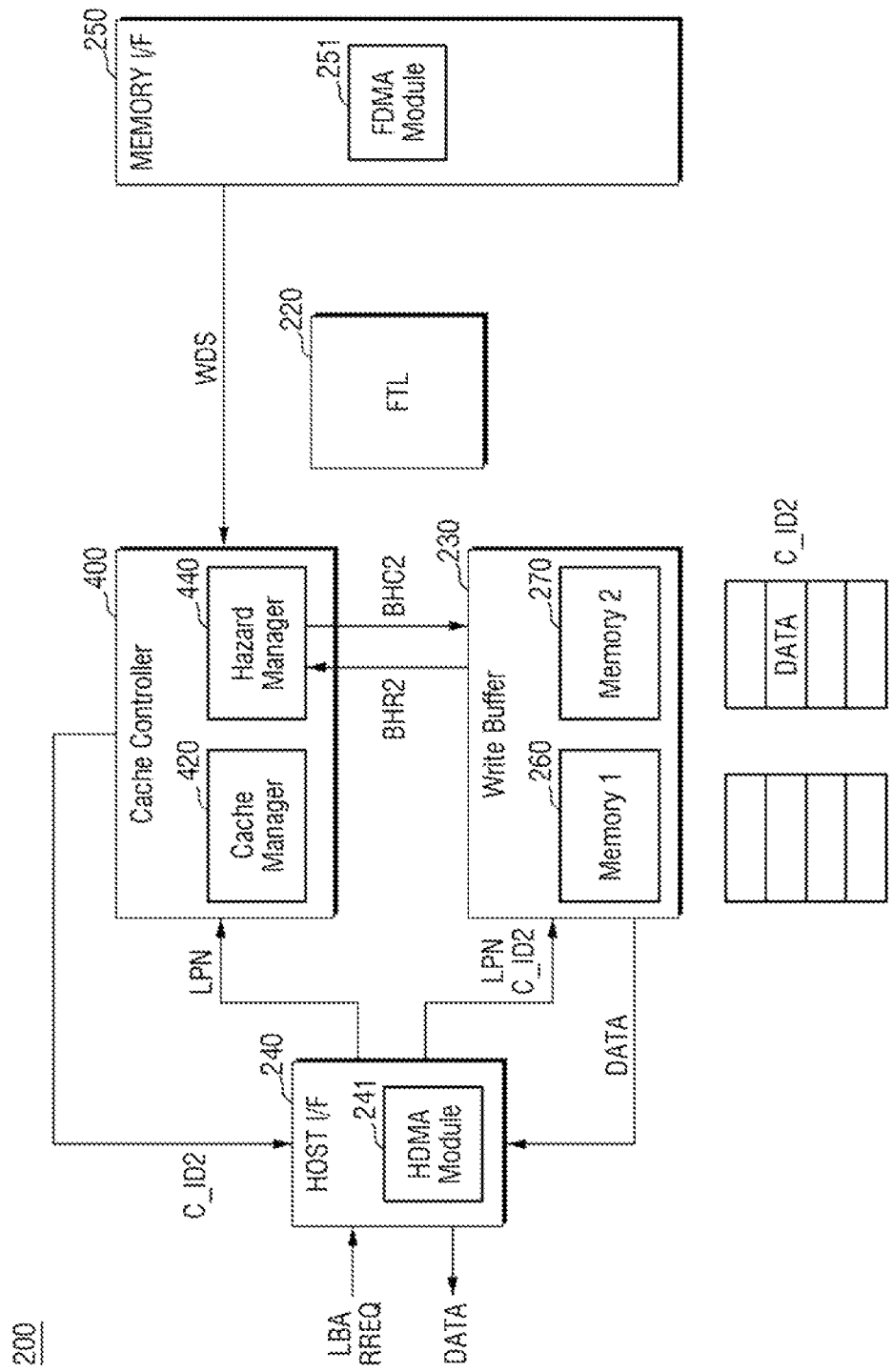

Referring to FIGS. 13 and 15, the host 100 may provide the logical block address LBA and the read request signal RREQ to the memory controller 200 (S532). The host interface 240 may receive the logical block address LBA and the read request signal RREQ to provide the logical page number LPN to the cache controller 400. The second hazard management time period tHZD2 corresponds to the time after the buffer swap of the memory controller 200 is completed.

The hazard manager 440 may perform a hit on the second memory 270 corresponding to the received logical page number LPN (S533). For example, the hazard manager 440 may provide the second buffer hit check signal BHC2 to the write buffer 230, and may receive a second buffer hit response signal BHR2 in response to the second buffer hit check signal BHC2. At this time, the hazard manager 440 may check that the data DATA corresponding to the logical page number LPN exists in the second memory 270. However, the embodiments of the present disclosure are not limited to this example, and the second buffer hit check signal BHC2 and the second buffer hit response signal BHR2 may be omitted.

The hazard manager 440 may provide the host interface 240 with the second cache ID C_ID2 corresponding to the address of the second memory 270 in which the data DATA is stored. The host interface 240 may provide the second cache ID C_ID2 to the host 100 (S534), and the host 100 may receive the second cache ID C_ID2. The write buffer 230 may receive the second cache ID C_ID2 and the logical page number LPN, and may provide the host interface 240 with the data DATA buffered in the second memory 270 in response to the second cache ID C_ID2 and the logical page number LPN. The host interface 240 may provide the data DATA to the host 100. Therefore, the host 100 may read the data DATA without a RAW risk in the second hazard management time period tHZD2. For example, in the hazard management time period tHZD, the memory controller 200 may continue to manage the hazard to the write buffer 230, whereby the memory storage device 10 with improved reliability may be provided.

Hereinafter, a memory controller 200' that buffers first to (mn)th data DATA1 to DATAmn be described with reference to FIGS. 16 and 17.

Figure 16:
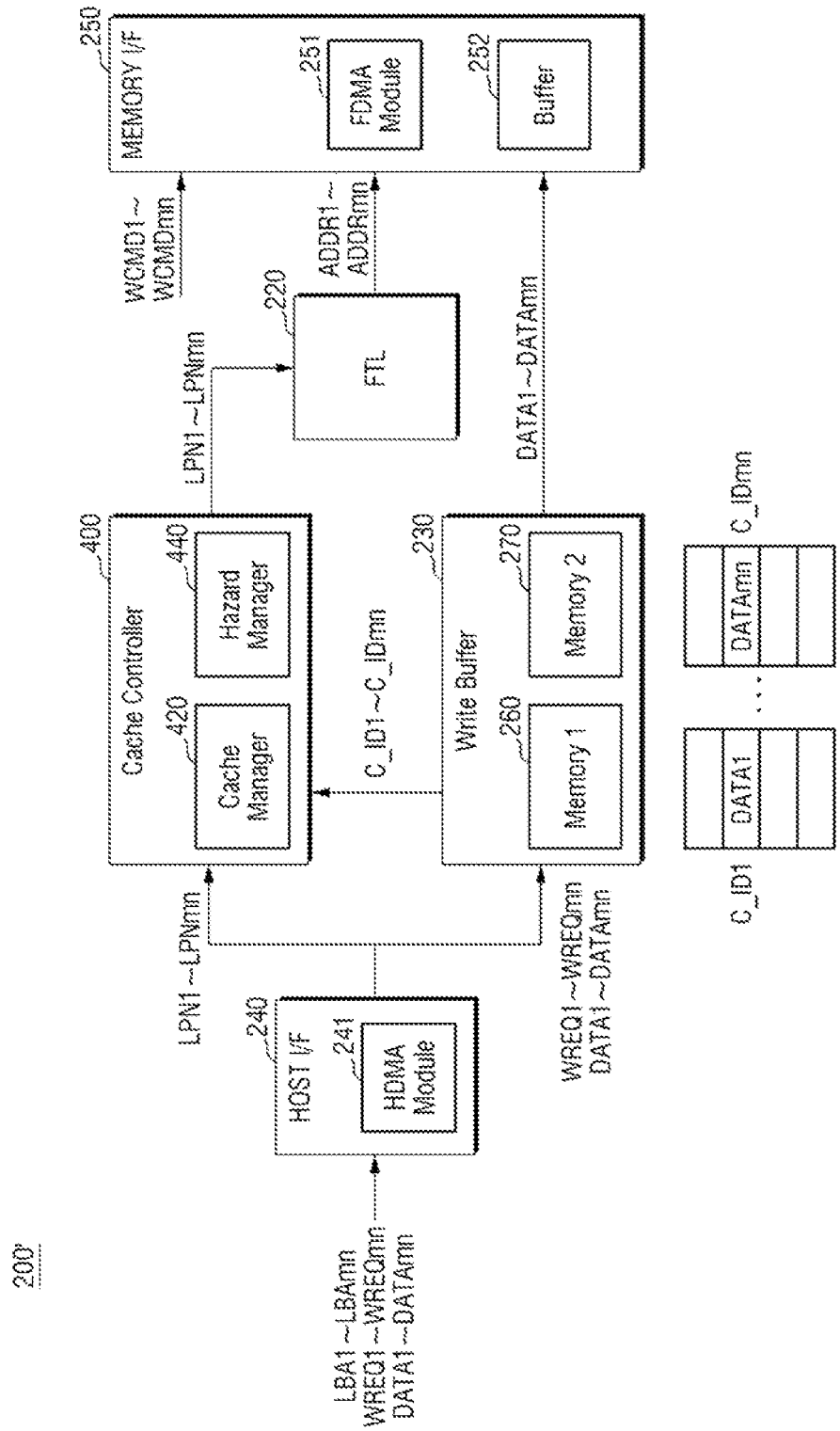
FIGS. 16 and 17 are block diagrams illustrating a memory controller, according to embodiments.
Figure 17:
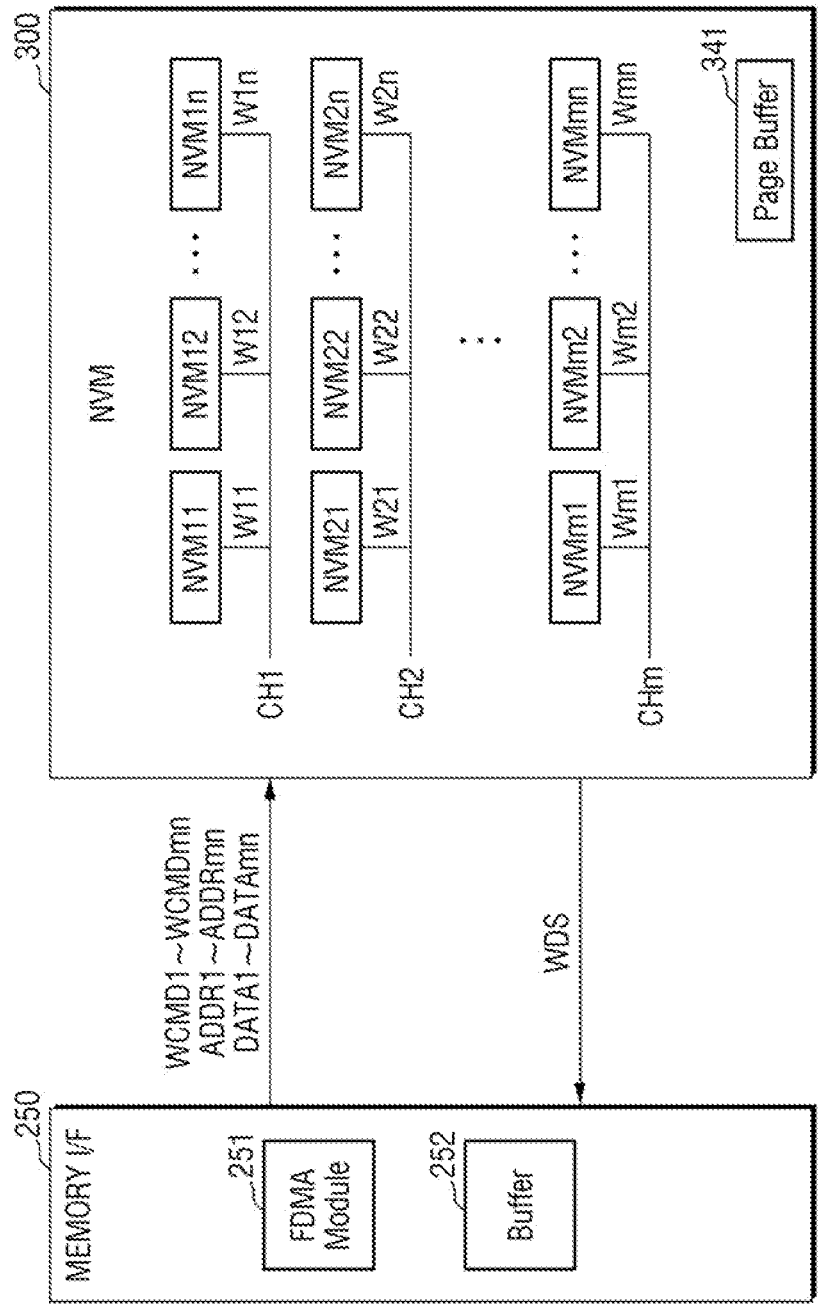

FIGS. 16 and 17 are block diagrams illustrating a memory controller according to some embodiments. For convenience of description, a portion duplicated with that described with reference to FIGS. 1 to 15 will briefly be described or omitted.

Referring to FIG. 16 and FIG. 17, the nonvolatile memory 300 may include a plurality of nonvolatile memory devices NVM11 to NVMmn. This nonvolatile memory 300 may be the same as the nonvolatile memory device described with reference to FIG. 4. Each of the nonvolatile memory devices NVM11 to NVMmn may be connected to one of a plurality of channels CH1 to CHm through a corresponding way. In addition, the memory controller 200' may transmit and receive signals to and from the nonvolatile memory 300 through the plurality of channels CH1 to CHm.

The memory controller 200' may transmit and receive signals to and from the nonvolatile memory 300 through the plurality of channels CH1 to CHm. For example, the memory controller 200' may transmit commands WCMD1 to WCMDmn, addresses ADDR1 to ADDRmn and data DATA1 to DATAmn to the nonvolatile memory 300 through the channels CH1 to CHm, or may receive the data DATA1 to DATAmn from the nonvolatile memory 300.

The write buffer 230 may buffer the first data to (mn)th data DATA1 to DATAmn in the first memory 260, and may provide first to (mn)th cache IDs C_ID1 to C_IDmn to the cache controller 400. The cache controller 400 may register the first to (mn)th cache IDs C_IDI 1 to C_IDmn and first to (mn)th logical page numbers LPN1 to LPNmn.

The memory interface 250 may receive the first to (mn)th write commands WCMD1 to WCMDmn. The memory interface 250 may receive the first to (mn)th addresses ADDR1 to ADDRmn, which are converted by the FTL 220. In addition, the memory interface 250 may receive the buffered first to (mn)th data DATA1 to DATAmn from the first memory 260 of the write buffer 230. In this case, the buffer 252 of the memory interface 250 may buffer the received first to (mn)th write commands WCMD1 to WCMDmn or the first to (mn)th addresses ADDR1 to ADDRmn, and may provide the buffered result to the nonvolatile memory 300. At this time, the first to (mn)th addresses ADDR1 to ADDRmn may correspond to addresses based on different channels CH1 to CHm and ways W11 to Wmn. For example, the memory controller 200' may write the buffered data DATA1 to DATAmn in the address for each of the plurality of nonvolatile memory devices NVM11 to NVMmn.

Hereinafter, a memory storage device 10 that includes a program fail module PFL will be described with reference to FIGS. 18 and 19.

Figure 18:
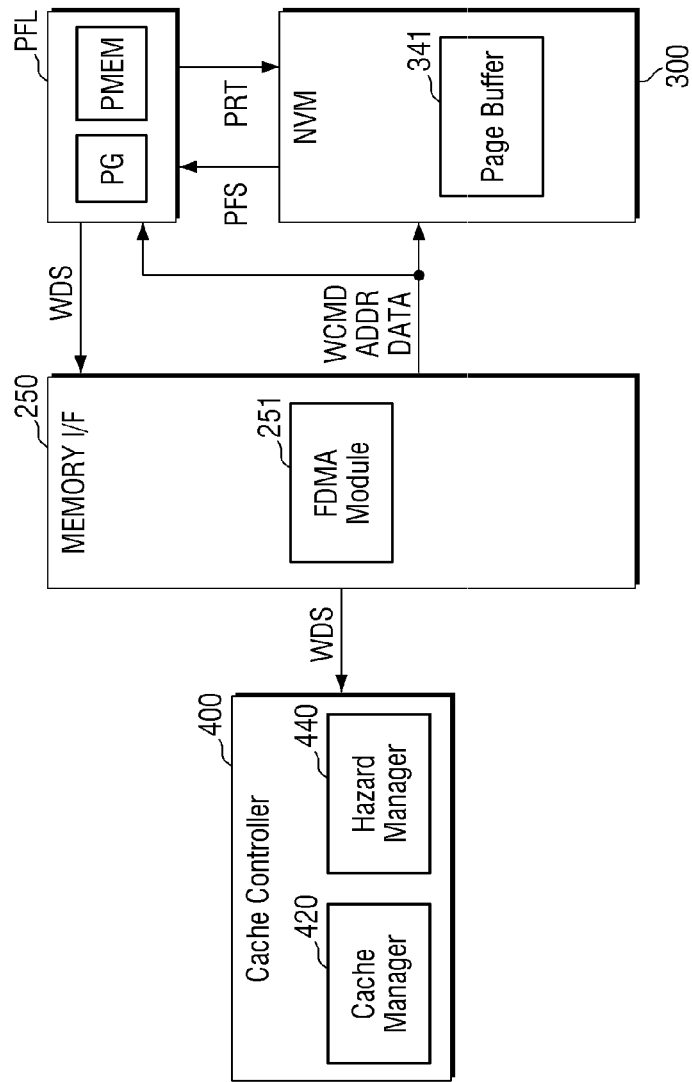
FIG. 18 is a block diagram illustrating a memory storage device according to some embodiments.

FIG. 18 is a block diagram illustrating a memory storage device according to some embodiments. FIG. 19 is a ladder diagram illustrating an operation of a memory storage device according to some embodiments. For convenience of description, a portion duplicated with that described with reference to FIGS. 1 to 15 will briefly be described or omitted.

Figure 19:
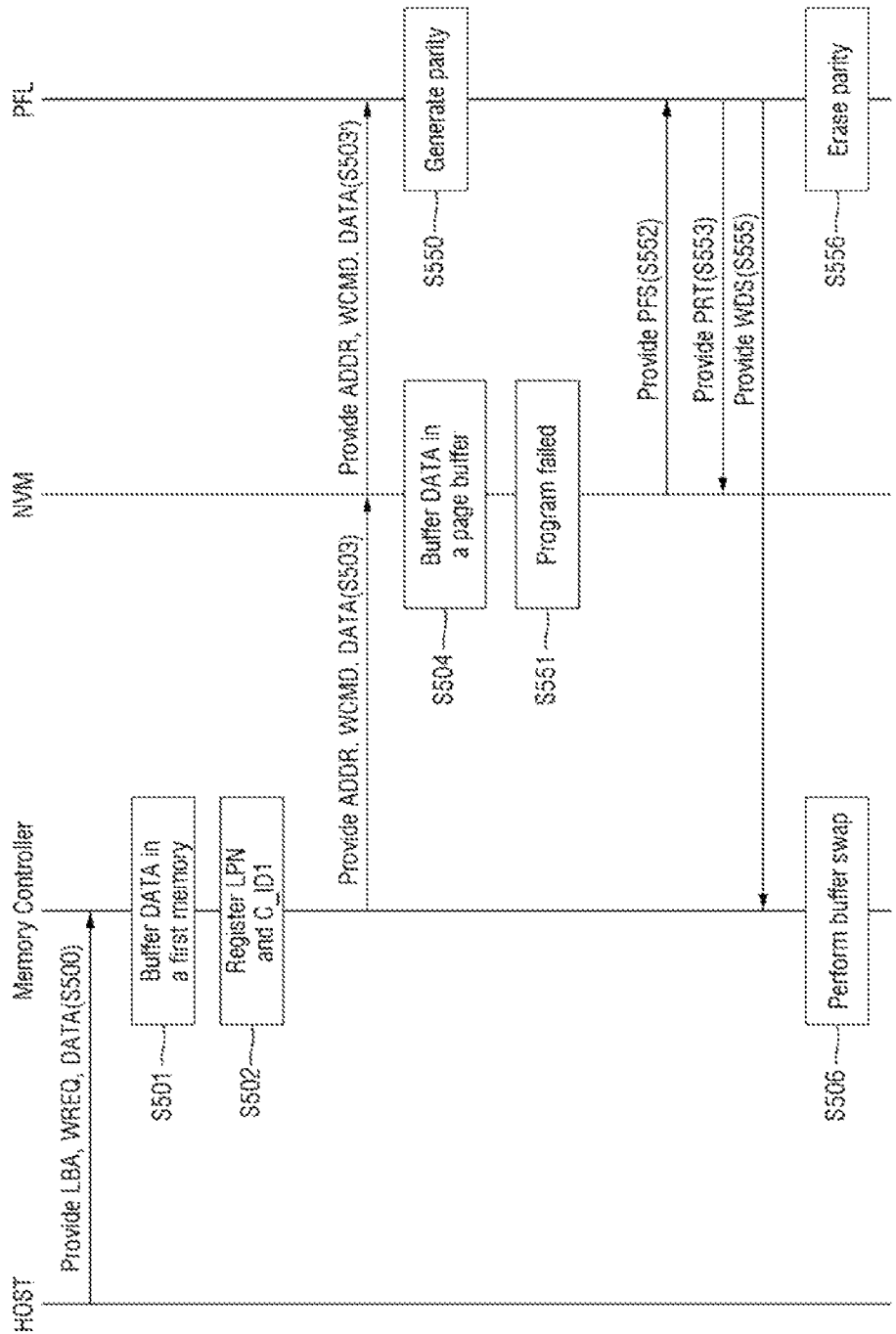
FIG. 19 is a ladder diagram illustrating an operation of a memory storage device, according to embodiments.

Referring to FIGS. 18 and 19, the memory storage device 10 may further include a program fail module PFL. The program fail module PFL may be connected to both the memory controller 200 and the nonvolatile memory 300. Alternatively, the program fail module PFL may be included in any one of the memory controller 200 and the nonvolatile memory 300. The program fail module PFL may be connected to the memory interface 250 and the nonvolatile memory 300.

The memory controller 200 or the nonvolatile memory 300 may provide the address ADDR, the write command WCMD, and the data DATA to the program fail module PFL (S503'). Subsequently, the nonvolatile memory 300 may buffer the data DATA in the page buffer 341 (S504).

The program fail module PFL may generate a parity PRT based on the received address ADDR, the write command WCMD, and the data DATA (S550). For example, the program fail module PFL may include a parity generator PG and a parity memory PMEM. The parity generator PG may generate the parity PRT based on the address ADDR and the data DATA, and the parity memory PMEM may store the generated parity PRT. The parity memory PMEM may be an SRAM, but the embodiments of the present disclosure are not limited thereto.

Programming to the memory cell array 310 of the nonvolatile memory 300 may fail (S551). For example, a situation such as a sudden power off (SPO) may occur, whereby programming the data DATA to the nonvolatile memory 300 may be interrupted. In this case, the nonvolatile memory 300 may provide a program fail signal PFS to the program fail module PFL (S552). The program fail module PFL may provide the parity PRT to the nonvolatile memory 300 in response to the program fail signal PFS (S553). At this time, the parity PRT may be data stored in the parity memory PMEM of the program fail module PFL. The nonvolatile memory 300 may continue to program the data DATA based on the parity PRT received from the program fail module PFL.

At this time, the program fail module PFL may provide the write done signal WDS to the memory controller 200 (S555). For example, the nonvolatile memory 300 may not provide the write done signal WDS, but the program fail module PEL that has provided the parity PRT to the nonvolatile memory 300 output the write done signal WDS. At this time, the memory controller 200 may perform the buffer swap in response to the write done signal WDS (S506).

The memory storage device 10 that includes the program fail module PFL may have a small capacitor, and its electric capacity for maintaining the power when a program fail status occurs may be small. Therefore, the memory storage device 10 may restore the data DATA through the program fail module PFL, perform the buffer swap through the write done signal WDS and release the first memory 260.

Hereinafter, a memory controller 200" according to still another embodiment will be described with reference to FIGS. 20 to 22.

Figure 20:
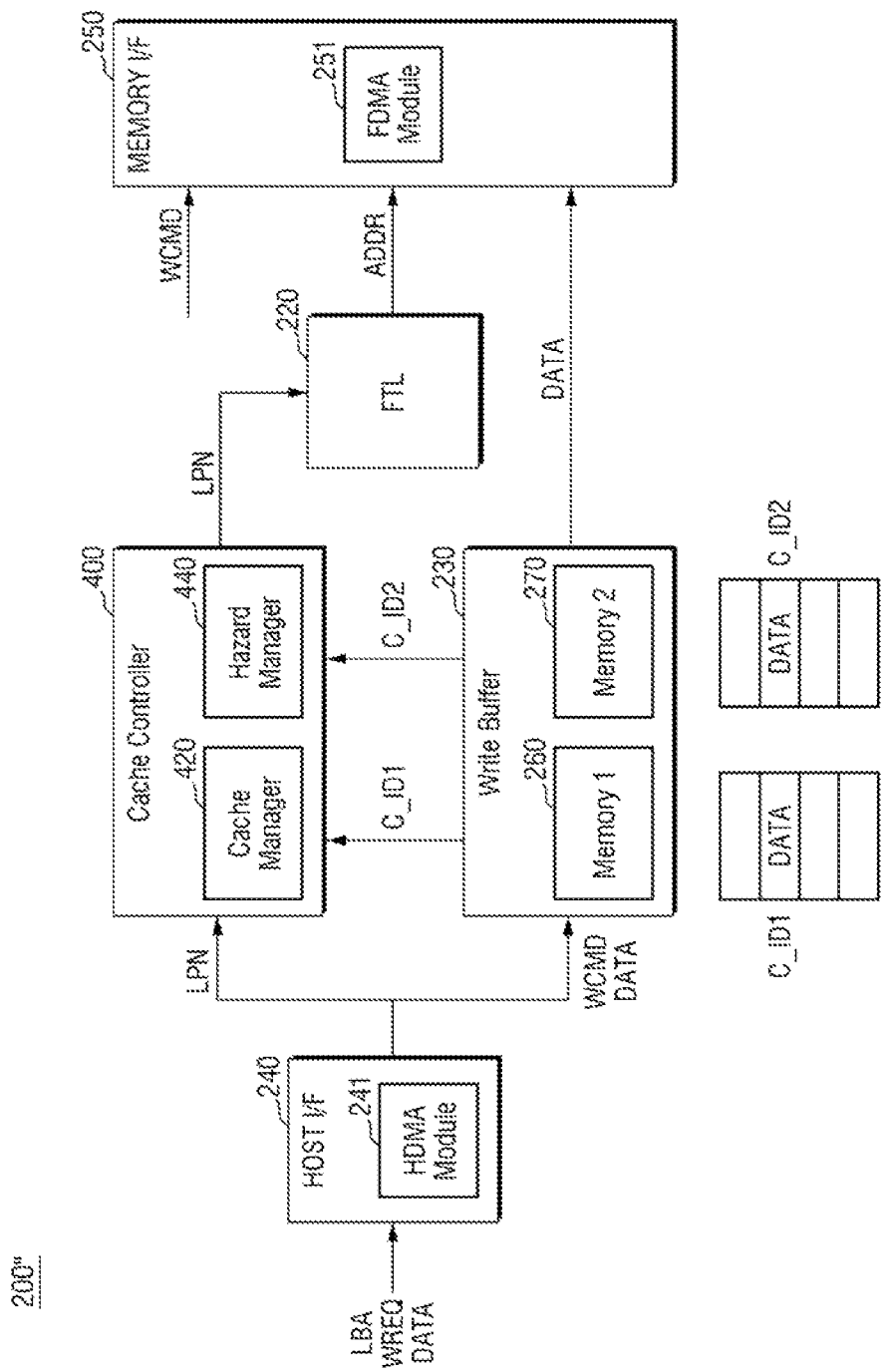
FIG. 20 is a block diagram illustrating a memory storage device, according to embodiments.

FIG. 20 is a block diagram illustrating a memory storage device according to some embodiments. FIG. 21 is a ladder diagram illustrating an operation of a memory storage device according to some embodiments. FIG. 22 is a block diagram illustrating an operation of a memory storage device according to some embodiments. For convenience of description, a portion duplicated with that described with reference to FIGS. 1 to 15 will briefly be described or omitted.

Figure 21:
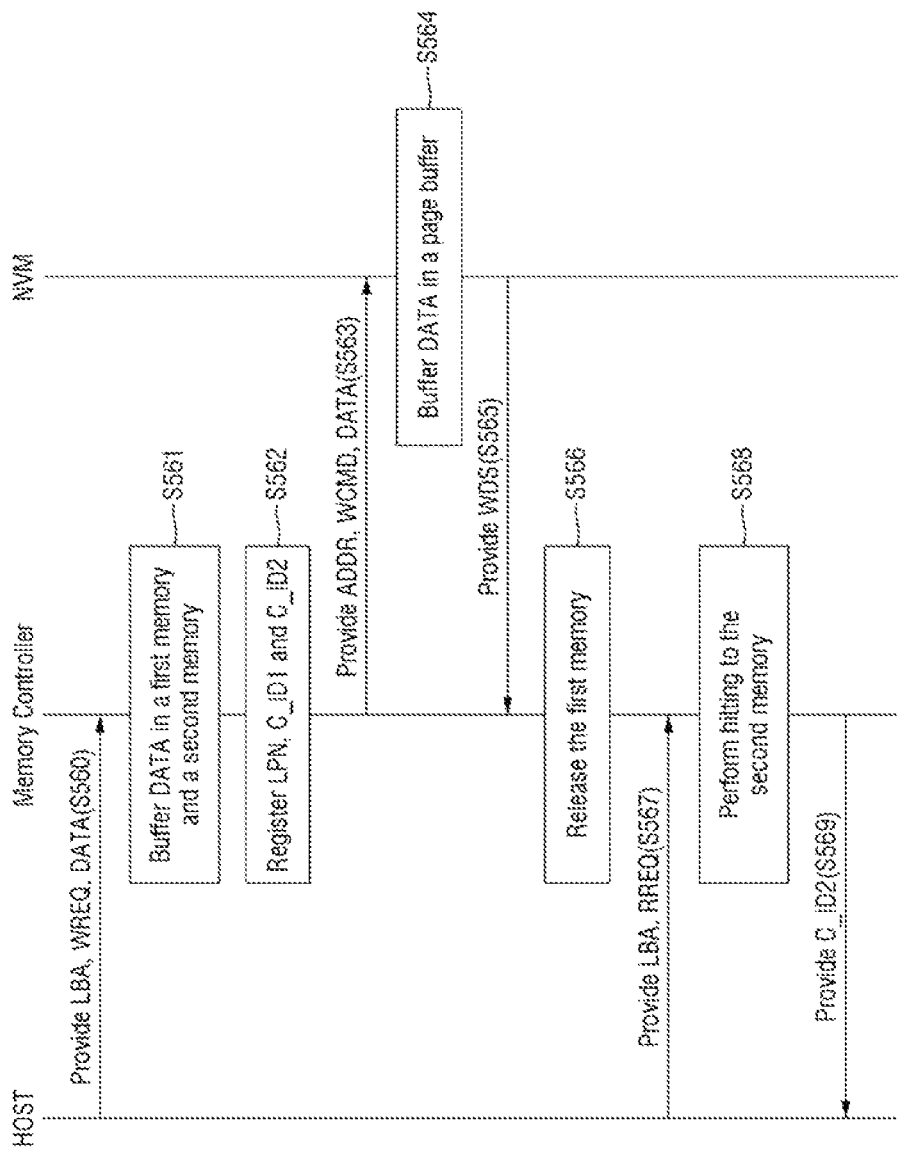
FIG. 21 is a ladder diagram illustrating an operation of a memory storage device, according to embodiments.

Referring to FIGS. 20 and 21, the host 100 may provide the logical block address LBA, the write request signal WREQ and the data DATA to the memory controller 200" (S560).

The memory controller 200" may buffer the data DATA in the first memory 260 and the second memory 270 of the write buffer 230 (S561). That is, unlike the memory controller 200 described with reference to FIGS. 1 to 15, the memory controller 200" may buffer the data DATA in both the first memory 260 and the second memory 270 from the start. The address of the first memory 260 in which the data DATA is stored may correspond to the first cache ID C_ID1, and the address of the second memory 270 in which the data DATA is stored may correspond to the second cache ID C_ID2.

The memory controller 200" may register the logical page number LPN, the first cache ID C_ID1 and the second cache ID C_ID2 (S562). For example, the cache controller 400 may register the logical page number LPN, the first cache ID C_ID1 and the second cache ID C_ID2 in the cache entry manager or the hazard manager 440. At this time, the hazard manager 440 may manage the hazard to the first memory 260 and the second memory 270 based on the first cache ID C_ID1 and the second cache ID C_ID2.

The memory controller 200" may provide the address ADDR, the write command WCMD and the data DATA to the nonvolatile memory 300 (S563), wherein the data DATA may be provided from the first memory 260 of the write buffer 230. The nonvolatile memory 300 may buffer the data DATA in the page buffer 341 (S564), and may provide the write done signal WDS to the memory controller 200" after buffering is completed (S565).

The memory controller 200" may release the first memory 260 in response to the write done signal WDS (S566). For example, the memory controller 200" may remove the data DATA buffered in the first memory 260. However, the data DATA buffered in the second memory 270 may not be removed.

Figure 22:
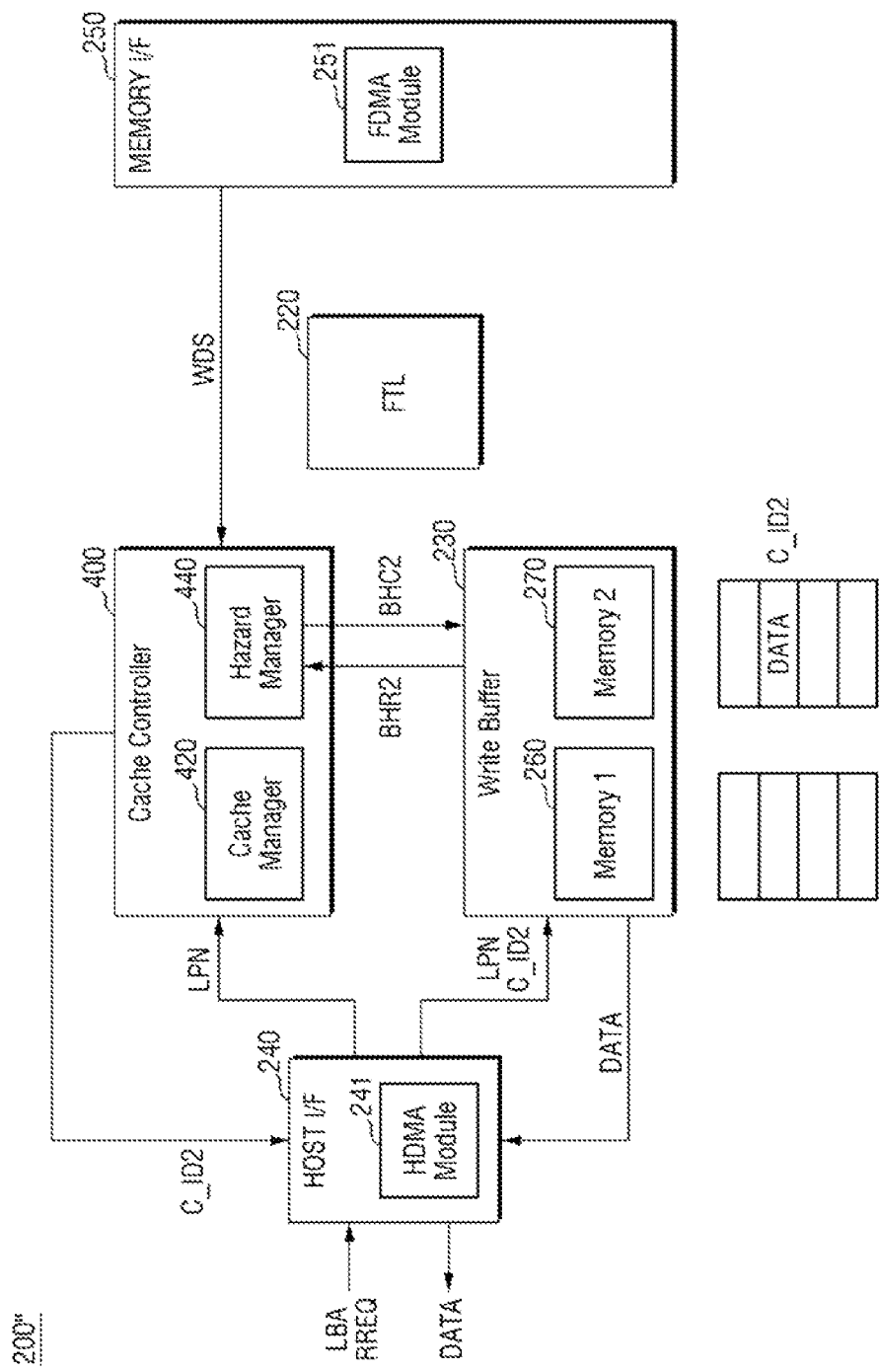
FIG. 22 is a block diagram illustrating an operation of a memory storage device, according to embodiments.

Referring to FIGS. 21 and 22, after the first memory 260 is released, the host 100 may provide the logical block address LBA and the read request signal RREQ to the memory controller 200" (S567). The memory controller 200" may perform a hit on the second memory 270 in response to the logical block address LBA and the read request signal RREQ (S568). For example, the first memory 260 may be released and a hit may be performed on the second memory 270 in which the data DATA is buffered.

The memory controller 200" may provide the second cache ID C_ID2 of the second memory 270 to the host 100 (S569). Therefore, the host 100 may provide the second cache ID C_ID2 to the memory controller 200" to receive the data DATA in response to the second cache ID C_ID2. In this case, since the data DATA is buffered in the first memory 260 and the second memory 270, the time for copying the data DATA may be reduced. As a result, a memory storage device 10 with improved reliability may be provided.

It is noted that two or more of the components or modules represented by a block in the drawings described above may be combined into one single component or module which performs all operations or functions of the combined two or more components or modules. Also, at least part of functions of at least one of these components or modules may be performed by another of these components or modules.

Although the embodiments of the present disclosure have been described with reference to the accompanying drawings, it will be apparent to those skilled in the art that the present disclosure can be manufactured in various forms without being limited to the above-described embodiments and can be embodied in other specific forms without departing from the spirit and essential characteristics of the specification. Thus, the above embodiments are to be considered in all respects as illustrative and not restrictive.

What is claimed is:

1. A memory storage device comprising:
a memory controller configured to receive data from an outer device; and
a nonvolatile memory connected to the memory controller,
wherein the memory controller comprises:
a first buffer memory configured to store the data;
a second buffer memory different from the first buffer memory; and
a memory interface configured to provide the data provided from the first buffer memory to the nonvolatile memory,
wherein the nonvolatile memory is configured to store the data, and provide a write done signal to the memory interface after storing the data, and
wherein the memory controller is configured to:
copy the data stored in the first buffer memory to the second buffer memory and store a registration timestamp associated with the data, in response to the write done signal; and
remove the data stored in the first buffer memory and update the registration timestamp associated with the data based on the write done signal and a copy done signal indicating that the data stored in the first buffer memory has been copied to the second buffer memory.

2. The memory storage device of claim 1, wherein the memory controller is further configured to receive a read request signal from the outer device, provide the data stored in the first buffer memory in response to the read request signal before the copying to the second buffer memory, and provide the data copied to the second buffer memory in response to the read request signal after the copying to the second buffer memory.

3. The memory storage device of claim 2, wherein the first buffer memory comprises a static random access memory (SRAM), and the second buffer memory comprises a dynamic random access memory (DRAM).

4. The memory storage device of claim 3, wherein a storage capacity of the first buffer memory is smaller than that of the second buffer memory.

5. The memory storage device of claim 3, wherein a data processing speed of the first buffer memory is greater than that of the second buffer memory.

6. The memory storage device of claim 1, wherein the nonvolatile memory comprises a page buffer and a memory cell array, and is configured to receive and store in the page buffer the data provided from the first buffer memory, and program the data stored in the page buffer to the memory cell array after providing the write done signal, and
wherein the memory controller is configured to copy the data stored in the first buffer memory to the second buffer memory while the nonvolatile memory is programming the data stored in the page buffer to the memory cell array.

7. The memory storage device of claim 6, wherein the memory controller is configured to remove the data copied to the second buffer memory after the data stored in the page buffer is programmed to the memory cell array.

8. The memory storage device of claim 1, wherein the memory controller is further configured to:
receive a read request signal from the outer device, provide the data stored in the first buffer memory in response to the read request signal before the copying to the second buffer memory;
provide the data copied to the second buffer memory in response to the read request signal after the copying to the second buffer memory;
generate a first hit to the first buffer memory in response to the read request signal before copying the data stored in the first buffer memory to the second buffer memory; and generate a second hit to the second buffer memory in response to the read request signal after the data has been copied to the second buffer memory.

9. The memory storage device of claim 1, wherein the nonvolatile memory is configured to generate the write done signal after completing a direct memory access (DMA) of the data in the nonvolatile memory.

10. A memory storage device comprising:
a memory controller configured to receive data from an outer device; and
a nonvolatile memory connected to the memory controller,
wherein the memory controller comprises:
a first buffer memory configured to store the data in a first time period;
a second buffer memory configured to store the data in a second time period different from the first time period, the second buffer memory being different from the first buffer memory; and
a hazard management module configured to manage a hazard to the first buffer memory and the second buffer memory,
wherein the hazard management module is configured to provide a first address of the first buffer memory in response to a read command received in the first time period, and provide a second address of the second buffer memory in response to the read command received in the second time period,
wherein the memory controller is further configured to remove the data stored in the first buffer memory and update a registration timestamp associated with the data, based on a write done signal and a copy done signal, the write done signal indicating that the data has been stored in the nonvolatile memory, and the copy done signal indicating that the data stored in the first buffer memory has been copied to the second buffer memory.

11. The memory storage device of claim 10, wherein the first buffer memory comprises a static random access memory (SRAM), and the second buffer memory comprises a dynamic random access memory (DRAM).

12. The memory storage device of claim 10, wherein the memory controller provides the data stored in the first buffer memory in response to the read command received in the first time period, and provides the data stored in the second buffer memory in response to the read command received in the second time period.

13. The memory storage device of claim 10, wherein the second time period is subsequent to the first time period.

14. The memory storage device of claim 10, wherein the memory controller is configured to remove the data stored in the first buffer memory in the second time period.

15. The memory storage device of claim 10, wherein the memory controller is configured to provide the data stored in the first buffer memory to the nonvolatile memory,
wherein the nonvolatile memory is configured to program the data stored in the first buffer memory in a third time period, and
wherein the first time period and the second time period overlap the third time period.

16. The memory storage device of claim 10, wherein the hazard management module is configured to generate a first hit to the first buffer memory in the first time period, and generate a second hit to the second buffer memory in the second time period.

17. A memory storage device comprising:
a memory controller configured to receive data from an outer device; and
a nonvolatile memory connected to the memory controller,
wherein the memory controller comprises:
a first buffer memory configured to store the data;
a second buffer memory configured to store the data, the second buffer memory being different from the first buffer memory; and
a memory interface configured to provide a write command and the data provided from the first buffer memory to the nonvolatile memory,
wherein the nonvolatile memory is configured to store the data, and provide a write done signal to the memory interface after storing the data, and
wherein the memory controller is configured to remove the data stored in the first buffer memory and update a registration timestamp associated with the data, in response to the write done signal and a copy done signal indicating that the data stored in the first buffer memory has been copied to the second buffer memory, and provide a first address of the second buffer memory in response to a read command.

18. The memory storage device of claim 17, wherein the memory controller is further configured to provide a second address of the first buffer memory in response to the read command before receiving the write done signal.

19. The memory storage device of claim 17, wherein the first buffer memory and the second buffer memory are configured to store the data at the same time.

20. The memory storage device of claim 17, wherein the first buffer memory comprises a static random access memory (SRAM), and the second buffer memory comprises a dynamic random access memory (DRAM).

* * * * *